(12) United States Patent
Paschalakis

(10) Patent No.: US 9,779,320 B2
(45) Date of Patent: Oct. 3, 2017

(54) IMAGE PROCESSING APPARATUS AND METHOD FOR ENCODING AN IMAGE DESCRIPTOR BASED ON A GRADIENT HISTOGRAM

(71) Applicant: SISVEL TECHNOLOGY S.R.L., None (IT)

(72) Inventor: Stavros Paschalakis, Guildford (GB)

(73) Assignee: SISVEL TECHNOLOGY S.R.L., None (TO) (IT)

( * ) Notice: Subject to any disclaimer, the term of this patent is extended or adjusted under 35 U.S.C. 154(b) by 0 days.

(21) Appl. No.: 14/906,485

(22) PCT Filed: Jul. 16, 2014

(86) PCT No.: PCT/IB2014/063158
§ 371 (c)(1),
(2) Date: Jan. 20, 2016

(87) PCT Pub. No.: WO2015/011612
PCT Pub. Date: Jan. 29, 2015

(65) Prior Publication Data
US 2016/0162749 A1      Jun. 9, 2016

(30) Foreign Application Priority Data

Jul. 24, 2013   (IT) .............................. TO2013A0629

(51) Int. Cl.
*G06K 9/00*       (2006.01)
*G06K 9/38*       (2006.01)
(Continued)

(52) U.S. Cl.
CPC ............ *G06K 9/38* (2013.01); *G06K 9/4642* (2013.01); *G06T 9/00* (2013.01); *H04N 19/14* (2014.11);
(Continued)

(58) Field of Classification Search
CPC .......... G06K 9/03; G06K 9/4642; G06T 9/00; H04N 19/30; H04N 19/90
See application file for complete search history.

(56) References Cited

U.S. PATENT DOCUMENTS 8,054,170 B1 * 11/2011 Brandt ................. G06K 9/4676
340/453
2009/0172730 A1 * 7/2009 Schiff ..................... G06Q 30/02
725/34

(Continued)

FOREIGN PATENT DOCUMENTS

TW        201222288 A1    6/2012
TW        201327478 A1    7/2013

OTHER PUBLICATIONS

International Search Report dated Dec. 10, 2014, issued in PCT Application No. PCT/IB2014/063158, filed Jul. 15, 2014.
(Continued)

*Primary Examiner* — Phuoc Tran
(74) *Attorney, Agent, or Firm* — Workman Nydegger

(57) ABSTRACT

A method for encoding an image descriptor (H) based on gradient histograms ($h_p$) into a transformed descriptor (V) having transformed subdescriptors ($v_p$), wherein each gradient histogram ($h_p$) includes a plurality of histogram bins ($h_i$) and each subdescriptor ($v_p$) includes a set of values ($v_j$), wherein the subdescriptors ($v_p$) are generated according to an element utilization order list specifying a subdescriptor index (p) of the set of sub descriptors ($v_p$) and an element index (j) of the set of values ($v_j$).

25 Claims, 22 Drawing Sheets

(51) Int. Cl.
*G06K 9/46* (2006.01)
*H04N 19/14* (2014.01)
*H04N 19/90* (2014.01)
*G06T 9/00* (2006.01)
*H04N 19/30* (2014.01)
*H04N 19/40* (2014.01)

(52) U.S. Cl.
CPC .............. *H04N 19/90* (2014.11); *H04N 19/30* (2014.11); *H04N 19/40* (2014.11)

(56) References Cited

U.S. PATENT DOCUMENTS

| | | |
|---|---|---|
| 2012/0127276 A1 | 5/2012 | Tsai et al. |
| 2013/0121587 A1 | 5/2013 | Brandt |
| 2013/0155063 A1 | 6/2013 | Solem et al. |
| 2014/0006385 A1* | 1/2014 | Ebers ............... G06F 17/30274 |
| | | 707/722 |

OTHER PUBLICATIONS

Mehmet Firat Vural et al., *Registration of Multispectral Satellite Images with Orientation-Restricted SIFT*, Geoscience and Remote Sensing Symposium, 2009 IEEE International, XP03163120, Jul. 12, 2009, pp. 111-243.

Vijay Chandrasekhar et al., *Survey of SIFT Compression Schemes*, Stanford University, Dec. 31, 2010, XP002719362, 8 pgs.

B.S. Manjunath et al., Color and Texture Descriptors, IEEE Transactions on Circuits and Systems for Video Technology, vol. 11, No. 6, Jun. 2001, XP011014212, pp. 703-713.

Rui Ma et al., *MI-SIFT: Mirror and Inversion Invariant Generalization for SIFT Descriptor*, CIVR, ACM, Jul. 5, 2010, XP007918135, pp. 228-235.

Vijay Chandrasekhar et al., *ChoG: Compressed Histogram of Gradients A Low Bit-Rate Feature Descriptor*, 2009 IEEE Conference on Computer Vision and Pattern Recognition, Jun. 20-25, 2009, XP031607260, pp. 2504-2511.

* cited by examiner

| Priority | Subdescriptor $v_p$ | Element $v_j$ |
|---|---|---|
| 1 | 5 | 0 |
| 2 | 9 | 0 |
| 3 | 10 | 0 |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| ... | ... | ... |
| 126 | 3 | 5 |
| 127 | 12 | 5 |
| 128 | 15 | 5 |

Fig. 6

| Priority | Group $g_x$ | Element $v_j$ |
| --- | --- | --- |
| 1 | 2 | 0 |
| 2 | 1 | 0 |
| 3 | 0 | 0 |
| 4 | 2 | 6 |
| 5 | 2 | 1 |
| 6 | 1 | 1 |
| 7 | 0 | 1 |
| 8 | 2 | 2 |
| 9 | 1 | 2 |
| 10 | 0 | 2 |
| 11 | 1 | 6 |
| 12 | 0 | 6 |
| 13 | 2 | 7 |
| 14 | 1 | 7 |
| 15 | 0 | 7 |
| 16 | 2 | 3 |
| 17 | 1 | 3 |
| 18 | 0 | 3 |
| 19 | 2 | 4 |
| 20 | 1 | 4 |
| 21 | 0 | 4 |
| 22 | 2 | 5 |
| 23 | 1 | 5 |
| 24 | 0 | 5 |

Fig. 10

| Priority | Group $g_x$ | Element $v_j$ |
|---|---|---|
| 1 | 1 | 0 |
| 2 | 0 | 0 |
| 3 | 1 | 6 |
| 4 | 1 | 1 |
| 5 | 0 | 1 |
| 6 | 1 | 2 |
| 7 | 0 | 2 |
| 8 | 0 | 6 |
| 9 | 1 | 7 |
| 10 | 0 | 7 |
| 11 | 1 | 3 |
| 12 | 0 | 3 |
| 13 | 1 | 4 |
| 14 | 0 | 4 |
| 15 | 1 | 5 |
| 16 | 0 | 5 |

Fig. 13

| Priority | Group $g_x$ | Element $v_j$ |
|---|---|---|
| 1 | 3 | 0 |
| 2 | 1 | 0 |
| 3 | 2 | 0 |
| 4 | 0 | 0 |
| 5 | 3 | 6 |
| 6 | 3 | 1 |
| 7 | 1 | 1 |
| 8 | 2 | 1 |
| 9 | 0 | 1 |
| 10 | 3 | 2 |
| 11 | 1 | 2 |
| 12 | 2 | 2 |
| 13 | 0 | 2 |
| 14 | 1 | 6 |
| 15 | 2 | 6 |
| 16 | 0 | 6 |
| 17 | 3 | 7 |
| 18 | 1 | 7 |
| 19 | 2 | 7 |
| 20 | 0 | 7 |
| 21 | 3 | 3 |
| 22 | 1 | 3 |
| 23 | 2 | 3 |
| 24 | 0 | 3 |
| 25 | 3 | 4 |
| 26 | 1 | 4 |
| 27 | 2 | 4 |
| 28 | 0 | 4 |
| 29 | 3 | 5 |
| 30 | 1 | 5 |
| 31 | 2 | 5 |
| 32 | 0 | 5 |

IMAGE PROCESSING APPARATUS AND METHOD FOR ENCODING AN IMAGE DESCRIPTOR BASED ON A GRADIENT HISTOGRAM

BACKGROUND OF THE INVENTION

1. Field of the Invention

The present invention relates to a method for efficiently encoding, transcoding, decoding and processing image descriptors computed in local regions around image interest keypoints and to an image processing device comprising means for encoding, transcoding, decoding and processing such descriptors.

2. Present State of the Art

Such image descriptors have found wide applicability in many computer vision applications including object recognition, content-based image retrieval, and image registration, to name a few.

Existing approaches to the encoding of such descriptors exhibit certain drawbacks.

For example, existing encoding approaches result in descriptors which require parsing of the whole descriptors to perform transcoding, whereby a descriptor of a given descriptor length is converted to a descriptor of a different descriptor length, or to perform decoding and comparison of descriptors of different lengths.

As another example, existing encoding approaches are inefficient in terms of encoding complexity because they ignore the commonalities and redundancies in the operations which are required to produce variable-length image descriptors.

The not yet published Italian patent application no. TO2012A000602 filed by the Applicant itself describes the encoding of local image descriptors, whereby robust, discriminative, scalable and compact image descriptors are computed from image descriptors employing histograms of gradients based on the transformation of said histograms of gradients, where said transformation captures the salient and robust information contained therein in the form of the shape of the distributions and the relationship among their bin values.

In said not yet published Italian patent application encoding methods of said descriptors are disclosed which are more efficient than the prior art methods in terms of producing easily scalable bitstreams.

Such descriptors are disclosed in the above mentioned not yet published Italian patent application no. TO2012A000602 which discloses the computation of robust, discriminative, scalable and compact image descriptors from image descriptors employing histograms of gradients based on the transformation of said histograms of gradients, where said transformation captures the salient and robust information contained therein in the form of the shape of the distributions and the relationship among their bin values.

Important aspects of the computation of robust, discriminative, scalable and compact image descriptors from image descriptors employing histograms of gradients, in particular a SIFT image descriptor, according to the not yet published Italian patent application no. TO2012A000602 are hereinbelow described.

Briefly, with the SIFT method, local image descriptors are formed as follows: first, a search across multiple images scales and locations is performed to identify and localise stable image keypoints that are invariant to scale and orientation; then, for each keypoint, one or more dominant orientations are determined based on local image gradients, allowing the subsequent local descriptor computation to be performed relative to the assigned orientation, scale and location of each keypoint, thus achieving invariance to these transformations. Then, local image descriptors around keypoints are formed as follows: first, gradient magnitude and orientation information is calculated at image sample points in a region around the keypoint; then, these samples are accumulated into orientation histograms summarizing the contents over n×n subregions.

By way of illustration only, an example of a SIFT keypoint descriptor is shown in FIGS. 1a and 1b, where FIG. 1a shows a subdivision of a local region R into 4×4 subregions SR and FIG. 1b shows a subdivision of the 360° range of orientations into eight bins for each orientation histogram, with the length of each arrow corresponding to the magnitude of that histogram entry. Thus, a local image descriptor as illustrated in FIG. 1 has 4×4×8=128 elements. More details of the SIFT technique can be found in David G. Lowe, "Distinctive image features from scale-invariant keypoints," International Journal of Computer Vision, 60, 2 (2004), pp. 91-110.

According to the not yet published Italian patent application no. TO2012A000602, a robust, discriminative, scalable and compact image descriptor may be calculated from a SIFT descriptor as follows.

In the following description, H in an entire SIFT descriptor comprising 16 histograms of gradients h each with eight bins h, whereas V is an entire local descriptor according to the present invention comprising 16 subdescriptors v each with eight elements v.

Let H denote a SIFT local image descriptor comprising 16 histograms of gradients $h_0$-$h_{15}$, as shown in FIG. 2a, each histogram comprising eight bin values $h_0$-$h_7$, as shown in FIG. 2b. A more robust, discriminative, scalable and compact image descriptor may be computed by transforming each of $h_0$-$h_{15}$ of H and then performing scalar quantisation on the resultant transformed values. More specifically, each of $h_0$-$h_{15}$ is transformed according to Transform A or Transform B, as shown below, according to the transform utilisation information of FIG. 3, i.e., Transform A is applied to $h_0$, $h_2$, $h_5$, $h_7$, $h_8$, $h_{10}$, $h_{13}$, $h_{15}$ and Transform B is applied to $h_1$, $h_3$, $h_4$, $h_6$, $h_9$, $h_{11}$, $h_{12}$, $h_{14}$, giving the transformed descriptor V with subdescriptors $v_0$-$v_{15}$, corresponding to $h_0$-$h_{15}$ respectively, and each comprising elements $v_0$-$v_7$, giving a total of 128 elements.

Transform A $$v_0 = h_2 - h_6$$

$$v_1 = h_3 - h_7$$

$$v_2 = h_0 - h_1$$

$$v_3 = h_2 - h_3$$

$$v_4 = h_4 - h_5$$

$$v_5 = h_6 - h_7$$

$$v_6 = (h_0 + h_4) - (h_2 + h_6)$$

$$v_7 = (h_0 + h_2 + h_4 + h_6) - (h_1 + h_3 + h_5 + h_7) \quad (1)$$

Transform B $$v_0 = h_0 - h_4$$

$$v_1 = h_1 - h_5$$

$$v_2 = h_7 - h_0$$

$$v_3 = h_1 - h_2$$

$$v_4 = h_3 - h_4$$

$$v_5 = h_5 - h_6$$

$$v_6 = (h_1 + h_5) - (h_3 + h_7)$$

$$v_7 = (h_0 + h_1 + h_2 + h_3) - (h_4 + h_5 + h_6 + h_7) \quad (2)$$

Then, each element undergoes coarse scalar quantisation, for example ternary (3-level) quantisation, with the quantisation thresholds selected so as to achieve a specific occurrence probability distribution among the quantisation bins for each element. This scalar quantisation produces the quantised descriptor V, with subdescriptors $v_{,0}$-$v_{,15}$, each comprising elements $v_{,0}$-$v_{,7}$, again with a total of 128 elements. This compact descriptor captures the most discriminative and robust information contained in the original histograms of gradients, in the form of the shape of the distributions and the relationship among their bin values.

A key advantage of descriptor V, as well as its quantised version $V_{,}$, is that it is highly scalable, and its dimensionality may be easily reduced if required by an application's storage requirements or a transmission channel's characteristics by simply eliminating one or more of its elements. For the sake of simplicity, in the description that follows there will be described important aspects of the invention in terms of the encoding of pre-quantised descriptor V with subdescriptors $v_0$-$v_{15}$, each comprising elements $v_0$-$v_7$ and, unless otherwise stated, it should be understood that the encoding of the quantised descriptor V, proceeds in a similar manner.

FIGS. 4a-4e show exemplary sets of elements which have been found to produce excellent discriminative power and robustness for five target descriptor lengths, from descriptor length 0 (DL0), the shortest descriptor length utilising only 20 descriptor elements, to descriptor length 4 (DL4), the longest descriptor length utilising all 128 elements. More specifically, FIG. 4a shows an exemplary set of elements for descriptor length DL0 comprising 20 elements, FIG. 4b shows an exemplary set of elements for descriptor length DL1 comprising 40 elements, FIG. 4c shows an exemplary set of elements for descriptor length DL2 comprising 64 elements, FIG. 4d shows an exemplary set of elements for descriptor length DL3 comprising 80 elements, and FIG. 4e shows an exemplary set of elements for descriptor length DL4 comprising all 128 elements. Thus, for each descriptor length, each element of each subdescriptor will or will not be encoded according to the element utilisation sets of FIG. 4a-4e.

Key to this scalability property is that the set of utilised elements for each descriptor length must be the same as or a subset of the set of utilised elements for all higher descriptor lengths, as illustrated in FIGS. 4a-4e. This allows the transcoding and comparison of descriptors of different lengths by simple elimination of the excess elements of the descriptor with the higher descriptor length so that it is reduced to the same set of elements as the descriptor with the lower descriptor length.

A straightforward encoding method of this descriptor comprises calculating and encoding the elements in a "by-subdescriptor" order, i.e., in the general case as $v_{0,0}$, $v_{0,1}$, ..., $v_{0,7}$, $v_{1,0}$, $v_{1,1}$, ..., $v_{1,7}$, ..., $v_{15,0}$, $v_{15,1}$, ..., $v_{15,7}$ where $v_{i,j}$ denotes element $v_j$ of subdescriptor $v_i$. This means encoding elements $v_0, v_1, \ldots, v_7$ for transformed histogram $v_0$, then encoding elements $v_0, v_1, \ldots, v_7$ for transformed histogram $v_1$, etc., using the appropriate transforms, for example as illustrated in FIG. 3, and also using the appropriate element utilisation sets for the desired descriptor length, for example as illustrated in FIG. 4, to decide which elements should be encoded.

This encoding results, for example for a descriptor length DL0, to a descriptor $v_{0,0}$, $v_{1,0}$, $v_{2,0}$, $v_{3,0}$, $v_{4,0}$, $v_{5,0}$, $v_{5,6}$, $v_{6,0}$, $v_{6,6}$, $v_{7,0}$, $v_{8,0}$, $v_{9,0}$, $v_{9,6}$, $v_{10,0}$, $v_{10,6}$, $v_{11,0}$, $v_{12,0}$, $v_{13,0}$, $v_{14,0}$, $v_{15,0}$ and for a descriptor length DL1 to a descriptor $v_{0,0}$, $v_{0,1}$, $v_{1,0}$, $v_{1,1}$, $v_{2,0}$, $v_{2,1}$, $v_{3,0}$, $v_{3,1}$, $v_{4,0}$, $v_{4,1}$, $v_{5,0}$, $v_{5,1}$, $v_{5,2}$, $v_{5,6}$, $v_{6,0}$, $v_{6,1}$, $v_{6,2}$, $v_{6,6}$, $v_{7,0}$, $v_{7,1}$, $v_{8,0}$, $v_{8,1}$, $v_{9,0}$, $v_{9,1}$, $v_{9,2}$, $v_{9,6}$, $v_{10,0}$, $v_{10,1}$, $v_{10,2}$, $v_{10,6}$, $v_{11,0}$, $v_{11,1}$, $v_{12,0}$, $v_{12,1}$, $v_{13,0}$, $v_{13,1}$, $v_{14,0}$, $v_{14,1}$, $v_{15,0}$, $v_{15,1}$.

FIG. 5 illustrates the operation of such a straightforward encoder as a sequence of steps. In the following description, as well as in subsequent descriptions of an encoder's operation, unless otherwise specified, such a sequence of steps corresponds to steps which are conceptual and do not correspond to specific hardware of software implementations, components and instructions, but are representative of the overall operation of the encoder. More specifically, FIG. 5 illustrates the operation of an encoder for a descriptor length DLk, for example corresponding to one of the descriptor lengths illustrated in FIG. 4. In step S100 of FIG. 5, the encoding of the descriptor begins at the first subdescriptor, i.e., $v_0$. In step S110, the appropriate transform is selected for the subdescriptor being processed, for example according to the transform utilisation of FIG. 3. It should be noted that the computation of descriptor V from descriptor H according to two different transforms as described here is only an example. The computation of descriptor V from descriptor H may also be performed according to a single transform, for example only Transform A or only Transform B, rendering step S110 unnecessary, or according to more than two transforms. In step S120, the encoding of the subdescriptor being processed begins at the first subdescriptor element, i.e., $v_0$. Then, in step S130, the use or not of the particular element of the particular subdescriptor, i.e., $v_{0,0}$ is checked against the element utilisation information for descriptor length DLk, for example using one of the utilisation sets of FIG. 4. If the element is not in use, then processing moves to step S150. If the element is in use for the descriptor length DLk, then its encoding takes place in step S140. Here, as well as in subsequent descriptions of an encoder's operation, unless otherwise specified, the word "encoding" means one or more actions, or combination thereof, that make the element $v_{0,0}$ part of the local image descriptor, said actions including, but way of example and without limitation, the calculation according to the appropriate transform function of (1) or (2) seen earlier, the selection of the element for inclusion into the local image descriptor in the case all elements are pre-calculated without knowledge of which elements will be finally used in the descriptor, the quantisation of the element value, the storage of the element in volatile or non-volatile memory and the transmission of the element along a transmission channel. After step S140, or if it was decided that the element is not in use for the descriptor length DLk in step S130, the processing moves to step S150. In step S150, if the current element is not the last element of the subdescriptor, the processing moves to the next element of the subdescriptor, otherwise the processing moves to step S160. In step S160, if the current subdescriptor is not the last subdescriptor of the local image descriptor, the processing moves to the next subdescriptor of the local image descriptor, otherwise the processing ends. Thus, it is clear that steps S100, S120, S150, and S160 relate to the order in which the processing is performed, while steps S110, S130 and S140 relate to the actual encoding of the local image descriptor.

Another straightforward encoding method of this descriptor comprises calculating and encoding the elements in a "by-element" order, i.e., in the general case as $v_{0,0}$, $v_{1,0}, \ldots, v_{15,0}, v_{0,1}, v_{1,1}, \ldots, v_{15,1}, \ldots, v_{0,7}, v_{1,7}, \ldots, v_{15,7}$ i.e. encoding element $v_0$ for subdescriptors $v_0$, $v_1, \ldots, v_{15}$, then encoding element $v_1$ for subdescriptors $v_0$, $v_1, \ldots, v_{15}$, etc., again using the appropriate transforms, for example as illustrated in FIG. 3, and also using the appropriate element utilisation sets for the desired descriptor length, for example as illustrated in FIG. 4, to decide which elements should be encoded. Such an encoder may operate in an analogous fashion to the encoder of FIG. 5, with the appropriate reordering of steps. In general, neither of the two aforementioned methods offers an advantage over the other method. For the purposes of transcoding, decoding and processing, the decoder must also know the encoding process and the element ordering and utilisation sets to be able to process and compare descriptors, possibly of different lengths, for the purposes of the related computer vision applications. Thus, the element utilisation sets must be either permanently fixed or stored/transmitted alongside the descriptors. In this context, the straightforward encoding process is disadvantageous.

More specifically, such an encoding ignores the relative importance between different elements in the encoding order. Consequently, in terms of transcoding, whereby a descriptor of a given descriptor length is converted to a descriptor of a different descriptor length, or in terms of decoding and comparing descriptors of different lengths by comparing corresponding elements between the two descriptors, such an encoding necessitates parsing of the descriptors to achieve the desired result.

Furthermore, such an encoding ignores the redundancy patterns in the relative importance between different elements and is unnecessarily complex with regards to deciding whether specific elements should be encoded or not.

SUMMARY OF THE INVENTION

It is therefore an object of the present invention to disclose a method for encoding an image descriptor based on a gradient histogram, and relative image processing apparatus, which is more efficient with respect to the prior art methods.

It is a further object of the present invention to disclose a method for encoding an image descriptor based on a gradient histogram, and relative image processing apparatus, which is more flexible.

It is a further object of the present invention to disclose a method for encoding an image descriptor based on a gradient histogram, and relative image processing apparatus, which allows to achieve an optimised encoder implementation.

It is a further object of the present invention to disclose a method for encoding an image descriptor based on a gradient histogram, and relative image processing apparatus, which allows to obtain image descriptors of any length.

These and other objects of the invention are achieved through a method for encoding an image descriptor based on a gradient histogram, and relative image processing apparatus, as claimed in the appended claims, which are an integral part of the present description.

Briefly, it is disclosed a method for efficiently encoding image descriptors such as the ones above described by encoding them according to an element utilisation order, resulting in scalable descriptors which can be converted to lower descriptor lengths by simple descriptor truncation instead of parsing.

The encoding is carried out according to subdescriptor groups, formed according to the redundancy patterns in the relative importance between the corresponding elements of said subdescriptor groups.

More specifically, said grouping is performed by grouping subdescriptors whose corresponding elements have a similar importance in an ordering of all the elements of the descriptor according to their relative importance in terms of achieving high recognition performance, more specifically by grouping subdescriptors according to their distance from the descriptor centre and additionally by grouping subdescriptors according to the distance between them and/or additionally by ordering the subdescriptors of a group according to corresponding encoding characteristics and/or additionally by ordering the subdescriptors of a group according to the distance between them.

The encoding method according to the invention is advantageously more efficient that the prior art ones in terms of efficiency, of computational complexity and/or of the amount of information needed to generate scalable bit-streams.

Further features of the invention are set out in the appended claims, which are intended as an integral part of the present description.

BRIEF DESCRIPTION OF THE DRAWINGS

The above objects will become more apparent from the following detailed description of the method for encoding an image descriptor based on a gradient histogram, and relative image processing apparatus, with particular reference to the annexed drawings, wherein:

FIGS. 4*a*-4*e* show exemplary sets of elements for five respective targets descriptor lengths;

FIG. 6 shows an element utilisation order used by a method according to the present invention;

FIGS. 10, 13 and 15 show first, second and third group-element utilisation orders relating to the groupings of FIGS. 9, 12, 14 and 17, respectively;

FIGS. 21a-21e show exemplary sets of elements according to the grouping of FIG. 20;

DETAILED DESCRIPTION OF THE PREFERRED EMBODIMENTS

According to the invention, rather than encoding according to element utilisation sets for different descriptor lengths, a more efficient encoder may operate according to an element utilisation order, producing a descriptor whose elements are ordered according to the element utilisation order and which can be converted to lower descriptor lengths by simple descriptor truncation. Such an element utilisation order may take the form of a 128-element ordered list, which may be encoded in 112 bytes, each list entry specifying a subdescriptor index and an element index, as illustrated in FIG. 6. So, for example, FIG. 6 shows an element priority list whereby element $v_{5,0}$ is given the highest priority, element $v_{9,0}$ is given the second highest priority, etc. Therefore, such an element utilisation order encoder may produce a descriptor of length l by encoding the top l elements in the list.

Figure 7:
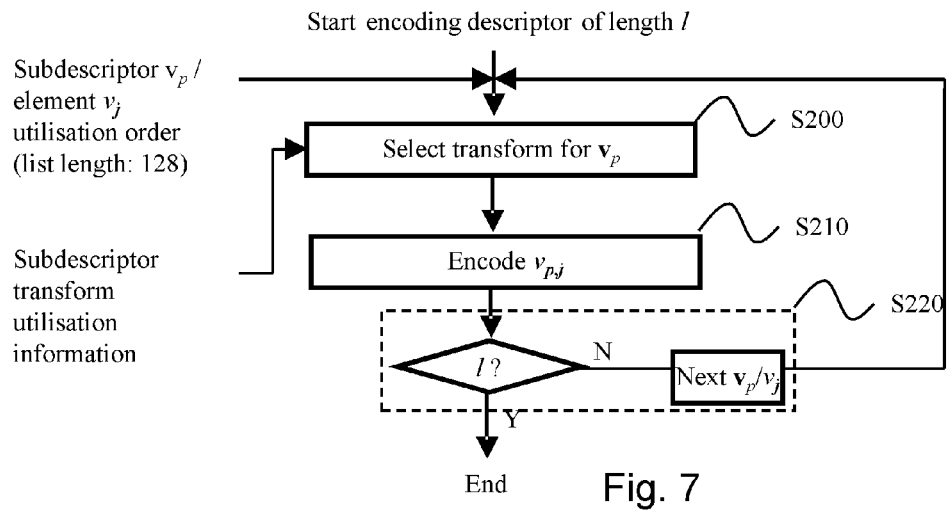
FIG. 7 illustrates the operation of an encoder using the element utilisation order of FIG. 6.

FIG. 7 illustrates the operation of such an encoder using the element utilisation order of FIG. 6. With the encoder of FIG. 7, the encoding of the descriptor begins with the element with the top priority (Priority 1) in the element utilisation order, i.e., element $v_0$ of subdescriptor $v_5$. In step S200, the appropriate transform is selected according to the subdescriptor to which this element belongs, for example according to the transform utilisation of FIG. 3. It should be noted that the computation of descriptor V from descriptor H according to two different transforms as described here is only an example. In different embodiments, the computation of descriptor V from descriptor H may also be performed according to a single transform, for example only Transform A or only Transform B, rendering step S200 unnecessary, or according to more than two transforms. Then, the encoding of the element, i.e., $v_{5,0}$, takes place in step S210. Then, in step S220, if a desired number of l elements of the descriptor has not yet been encoded, the processing moves to the element with the next highest priority in the element utilisation order, otherwise the processing ends. Thus, step S220 relates to the control of how many elements to encode, while steps S200 and S210 relate to the actual encoding of the local image descriptor.

Figures 4A, 4B, 4C, 4D, 4E:
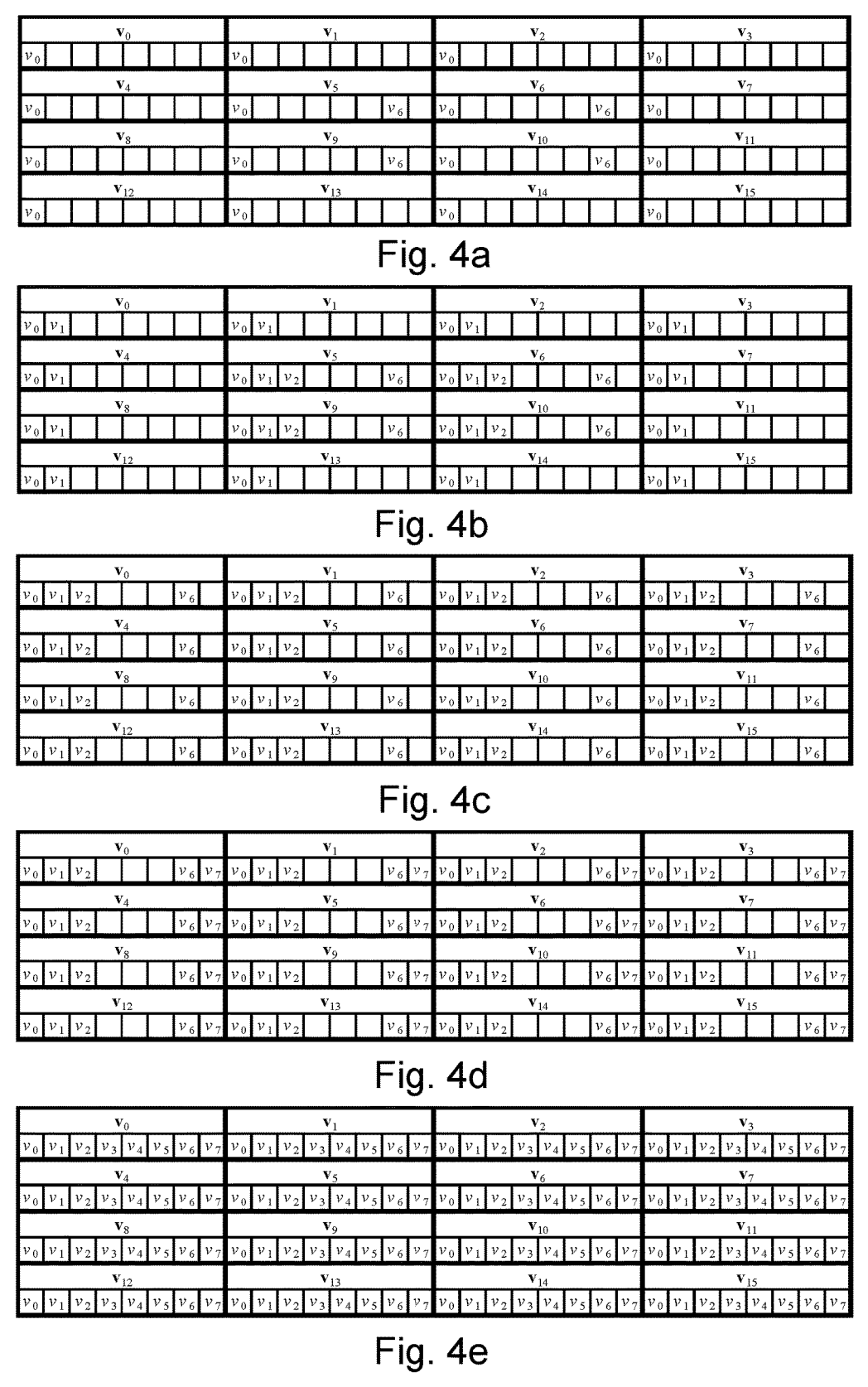
Figure 5:
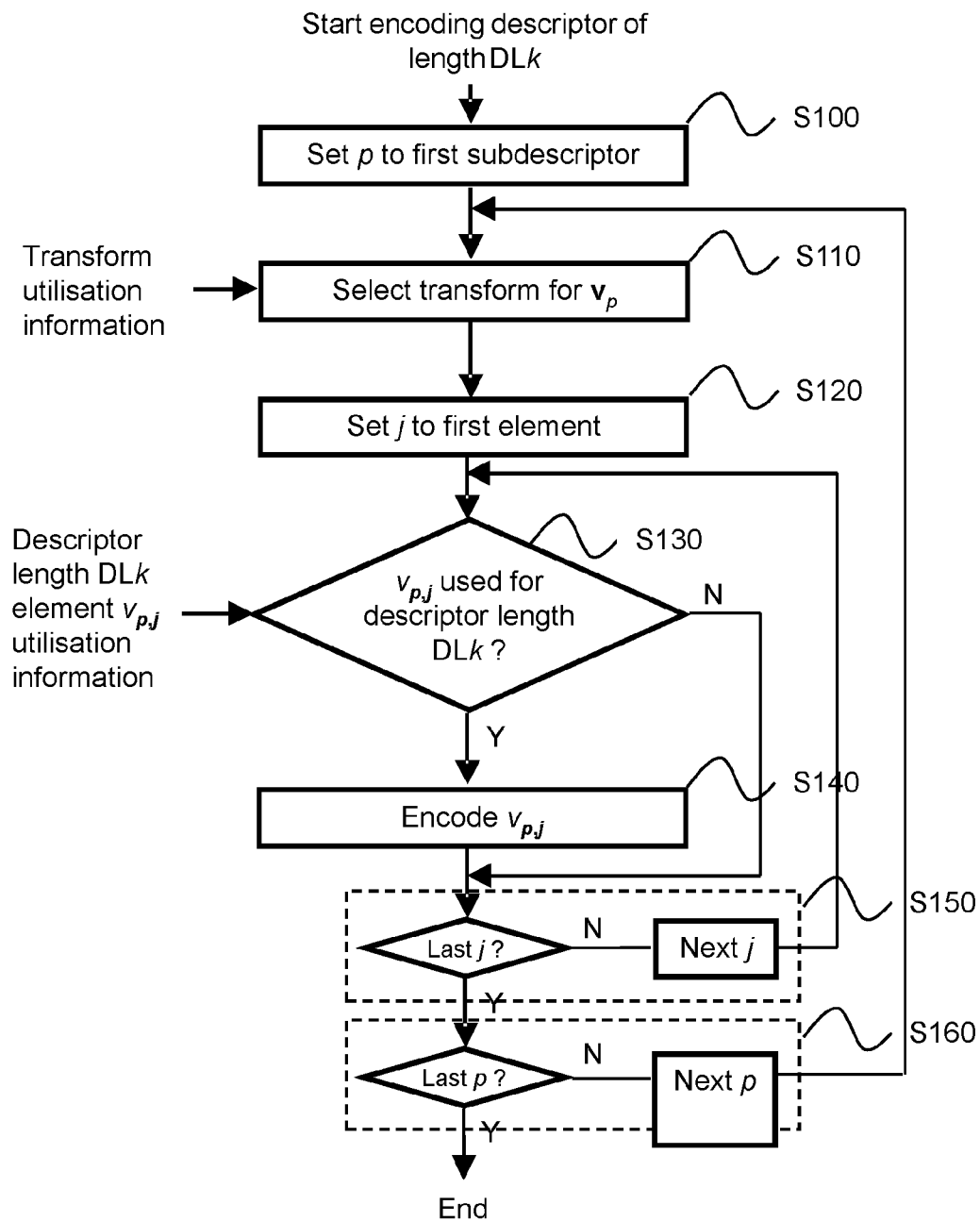
FIG. 5 represents a flow-chart illustrating the operation of an encoder using the sets of elements of FIG. 4.

Thus, the encoder of FIG. 7, using an element utilisation order as in FIG. 6, produces descriptors whose elements are ordered according to the element utilisation order and which can be converted to lower descriptor lengths by simple descriptor truncation, i.e., eliminating the last elements of the descriptor, and is more flexible than the encoder of FIG. 5 which uses element utilisation sets as in FIG. 4.

The number of elements l in the descriptor may be stored/transmitted alongside the descriptor, possibly at the image level. For the purposes of transcoding, decoding and processing, the decoder must also know the element ordering to be able to process for the purposes of the related computer vision applications. Thus, the element utilisation order must be either permanently fixed or stored/transmitted alongside the descriptors.

In practice, however, the efficiency of the encoder of FIG. 7 can be improved. This is because the element utilisation order illustrated in FIG. 6 contains a significant amount of redundancy and is, to some extent, impractical to generate and use.

The reason for this is that the complete set of 128 elements of V do not correspond to a single descriptor whose elements may be ordered according to a single priority list, but to 16 different 8-element subdescriptors, each subdescriptor extracted from a different histogram of gradients according to a specific transform and so that corresponding elements between all subdescriptors capture the relation between bins with the same angular separation.

Thus, it has been found that, in terms of achieving a high recognition performance with a limited set of elements, a descriptor needs to strike a balance between a uniform element distribution, i.e., selecting element(s) from as many subdescriptors as possible, and distance from the descriptor centre, i.e., giving higher priority to subdescriptors which are closer to the descriptor centre. At the same time, it has also been found that the importance of corresponding elements from different subdescriptors is approximately the same when the distance of the subdescriptors to the descriptor centre is the same, while the importance of corresponding elements from different subdescriptors increases as the distance of the subdescriptors to the descriptor centre decreases.

Figure 8:
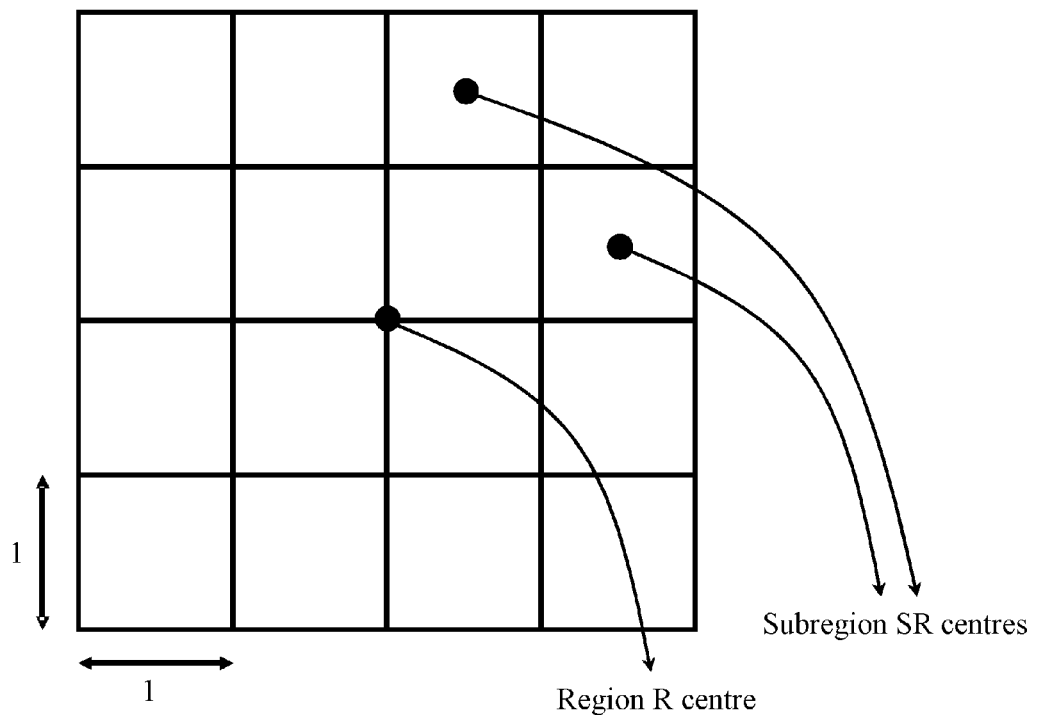
FIG. 8 shows the centres of a region and of a subregion of a local image descriptor.

In this context, the distance of a subdescriptor v to the descriptor centre refers to the distance between the centre of the subregion which corresponds to the histogram of gradients h which gives rise to the subdescriptor v and the centre of the region which comprises the subregions, as illustrated in FIG. 8. While it is possible to refer back to the dimensions of the image region and subregions to compute said distances, it is not necessary since there is only interest in comparing said distances. Therefore said distances may be computed by assuming that each side of each subregion has, for example, a unit length.

Furthermore, in this description said distances are Euclidean distances, although other suitable distance measures may also be used.

Consequently, it is observed that, for the purposes of efficient encoding of an image descriptor, its subdescriptors may be grouped so that corresponding descriptor elements for the subdescriptors of each group are assigned a common importance in the utilisation order and are encoded jointly.

First Embodiment

In a first embodiment of the invention, the subdescriptors are grouped according to their distance from the descriptor centre.

Figure 9:
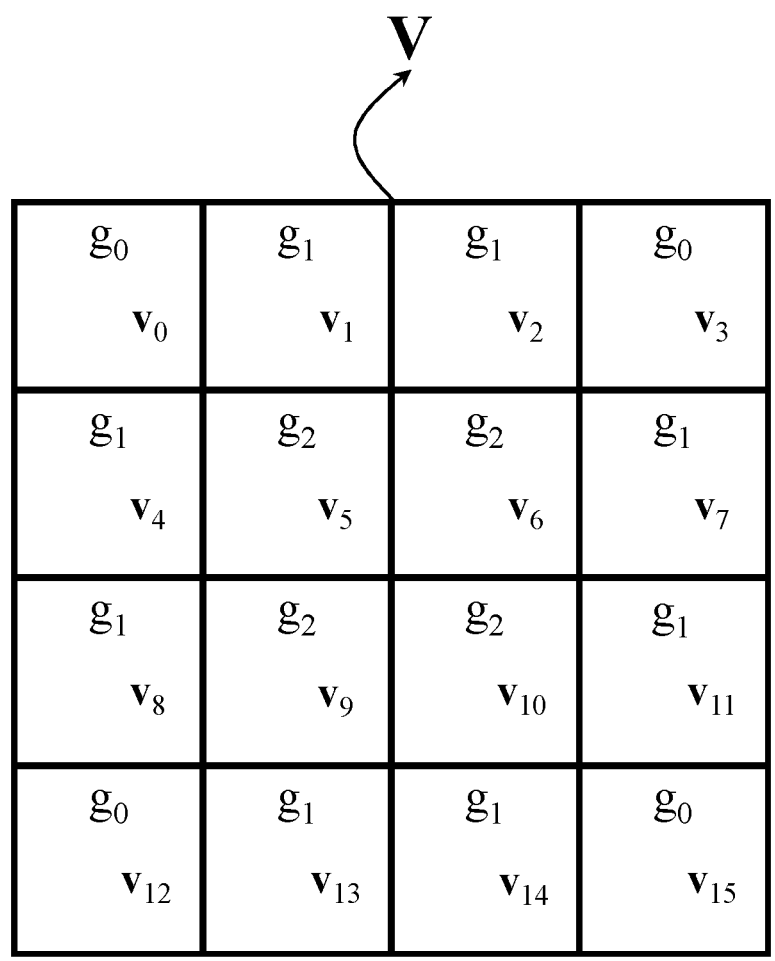
FIG. 9 shows a first grouping of subdescriptors of a local image descriptor according to a first embodiment or a fourth embodiment of a method according to the invention.

For example, one such grouping is illustrated in FIG. 9, where there are three groups, namely $g_0 = \{v_0, v_3, v_{12}, v_{15}\}$, containing the subdescriptors with the greatest distance to the descriptor centre, $g_1=\{v_1, v_2, v_4, v_7, v_8, v_{11}, v_{13}, v_{14}\}$, containing the subdescriptors with the second greatest distance to the descriptor centre, and $g_2=\{v_5, v_6, v_9, v_{10}\}$, containing the subdescriptors with the smallest distance to the descriptor centre. Within each group, the subdescriptors are ordered in ascending subdescriptor index order, although this is not restrictive and other orders may be used, such as clockwise starting from the top-most left-most subdescriptor in the group. Within each group, the corresponding elements of the subdescriptors of the group are all assigned the same encoding priority.

Based on this grouping, a group-element utilisation order may be generated, which may take the form of a 24-element ordered list, which may be encoded in 15 bytes, each list entry specifying a subdescriptor group and an element index, as illustrated in FIG. 10. It should be noted that the group-element utilisation order of FIG. 10 is merely an example, and different group-element utilisation orders may be generated by changing the priorities of the entries in the list.

Thus, the group-element utilisation order of FIG. 10 is much more economical than the element utilisation order of FIG. 6, in terms of length and encoding size. So, for example, FIG. 10 shows a group-element priority list whereby element $v_0$ of group $g_2$ is given the highest priority, instructing the encoder that the first four elements to encode are $v_{5,0}$, $v_{6,0}$, $v_{9,0}$ and $v_{10,0}$, element $v_0$ of group $g_1$ is given the second highest priority, instructing the encoder that the next eight elements to encode are $v_{1,0}$, $v_{2,0}$, $v_{4,0}$, $v_{7,0}$, $v_{8,0}$, $v_{11,0}$, $v_{13,0}$ and $v_{14,0}$, etc.

Figure 11:
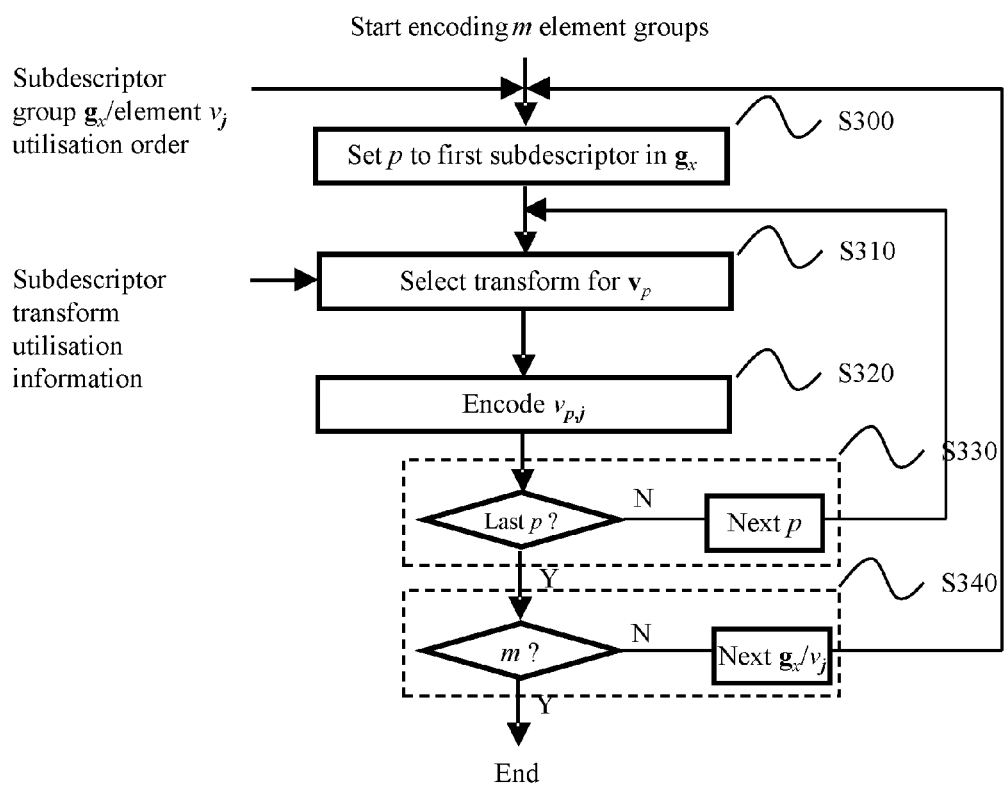
FIG. 11 illustrates the operation of an encoder according to a first, second or fourth embodiment of a method according to the invention.

FIG. 11 illustrates the operation of such an encoder using the group-element utilisation order of FIG. 10 and configured to encode the top m groups of elements in said group-element utilisation order. With the encoder of FIG. 11, the encoding of the descriptor begins with the group of elements with the top priority (Priority 1) in the group-element utilisation order, i.e., element $v_0$ of group $g_2$ comprising subdescriptors $v_5$, $v_6$, $v_9$, and $v_{10}$. In step S300, the encoding of the descriptor begins at the first subdescriptor of the group, i.e., $v_5$. In step S310, the appropriate transform is selected for the subdescriptor, for example according to the transform utilisation of FIG. 3. It should be noted that the computation of descriptor V from descriptor H according to two different transforms as described here is only an example. In different embodiments, the computation of descriptor V from descriptor H may also be performed according to a single transform, for example only Transform A or only Transform B, rendering step S310 unnecessary, or according to more than two transforms. Then, the encoding of the element, i.e., $v_{5,0}$, takes place in step S320. In step S330, if the current subdescriptor is not the last subdescriptor in the group, the processing moves to the next subdescriptor, otherwise the processing moves to step S340. Then, in step S340, if the desired number of m groups of elements has not yet been encoded, the processing moves to the group of elements with the next highest priority in the group-element utilisation order, otherwise the processing ends. Thus, steps S300, S330 and S340 relate to the order in which the processing is performed and to the control of how many groups of elements to encode, while steps S310 and S320 relate to the actual encoding of the local image descriptor.

The number of groups m or corresponding number of elements l in the descriptor may be stored/transmitted alongside the descriptor, possibly at the image level.

The fact that the group-element utilisation order of FIG. 10 is more economical than the element utilisation order of FIG. 6 results in a more efficient and economical encoder. Furthermore, as seen earlier, for the purposes of transcoding, decoding and processing, the decoder must also know the encoding process and the element utilisation order to be able to process and compare descriptors for the purposes of the related computer vision applications, which means that the element utilisation order must be either fixed or transmitted alongside the descriptors. Different applications may need to change the element utilisation order, possibly at the image or sub-image level, for example by giving higher priority to the subdescriptors closest to the descriptor centre, or by giving higher priority to a specific class of element, e.g., $v_7$ as opposed to $v_2$, in order to achieve high recognition performance with a limited set of elements. In this case, the element utilisation order must be stored or transmitted alongside the descriptors. Considering that low-bitrate descriptors are typically a few hundred bytes in size, the group-element utilisation order of FIG. 10 represents a much lower overhead than the element utilisation order of FIG. 6. Furthermore, the subdescriptor grouping may be fixed and known to both the encoder and the decoder, or may be transmitted alongside the descriptors. For example, for the grouping considered so far, the number of groups and the size of composition of each group may be encoded in less than 10 bytes.

Figure 12:
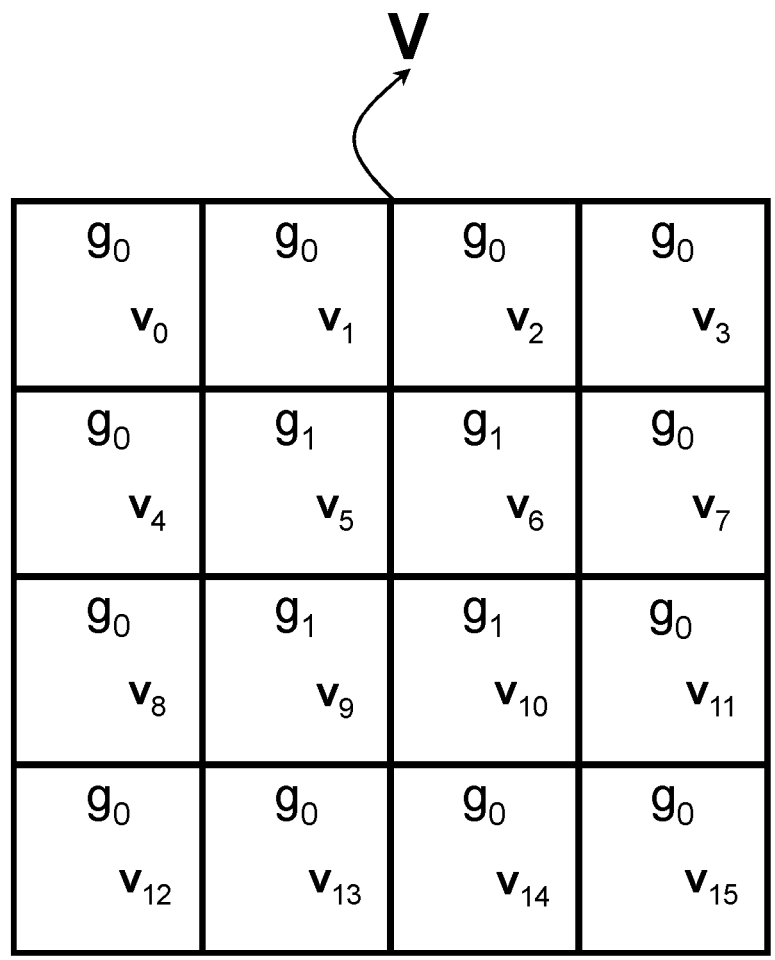
FIGS. 12 and 14 show second and third exemplary groupings, respectively, of subdescriptors of a local image descriptor according to the first embodiment of a method according to the invention.

As another example according to a first embodiment of the invention, a different grouping is illustrated in FIG. 12, where there are two groups, namely $g_0=\{v_0, v_1, v_2, v_3, v_4, v_7, v_8, v_{11}, v_{12}, v_{13}, v_{14}, v_{15}\}$, containing all the peripheral subdescriptors, and $g_1=\{v_5, v_6, v_9, v_{10}\}$, containing the subdescriptors with the smallest distance to the descriptor centre, i.e., all the central subdescriptors. Thus, with this example, group $g_0$ contains subdescriptors of varying distances to the descriptor centre, but always further away from the centre than the subdescriptors of group $g_0$. Within each group, the corresponding elements of the subdescriptors of the group are all assigned the same encoding priority. Based on this grouping, a group-element utilisation order may be generated, which may take the form of a 16-element ordered list, which may be encoded in 8 bytes, each list entry specifying a subdescriptor group and an element index, as illustrated in FIG. 13. The encoder of FIG. 11 may then be used again to encode a descriptor according to the group-element utilisation order of FIG. 13. It should be noted that the group-element utilisation order of FIG. 13 is merely an example, and different group-element utilisation orders may be generated by changing the priorities of the entries in the list.

Figure 14:
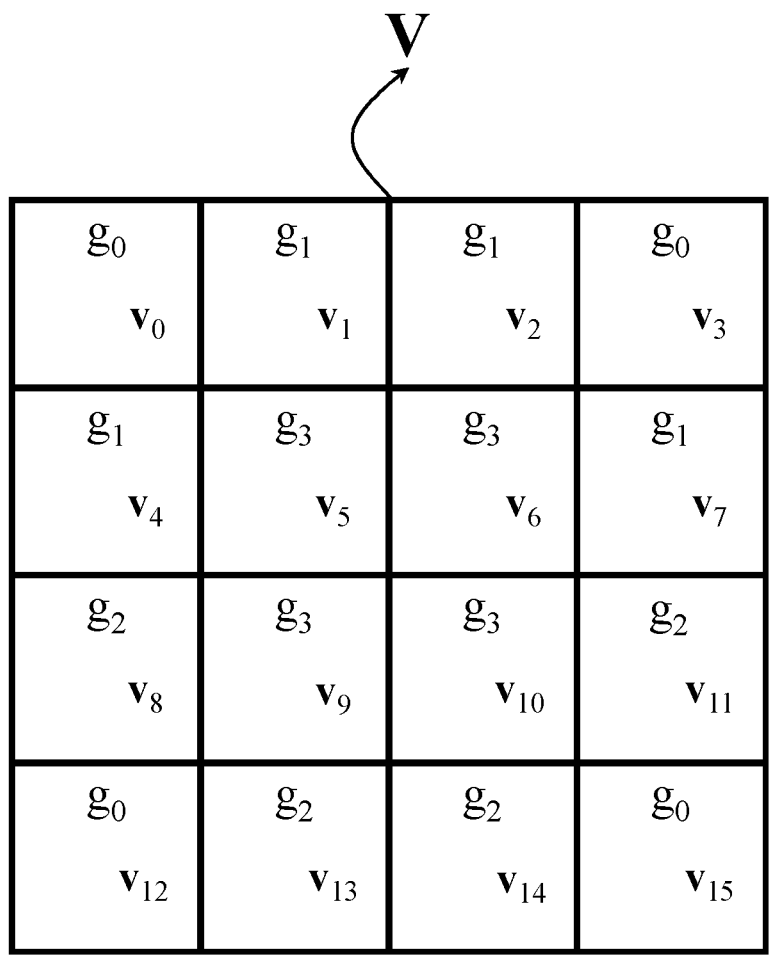

As another example according to a first embodiment of the invention, a different grouping is illustrated in FIG. 14, where there are four groups, namely $g_0=\{v_0, v_3, v_{12}, v_{15}\}$, containing the subdescriptors with the greatest distance to the descriptor centre, $g_1=\{v_1, v_2, v_4, v_7\}$, containing a set of four subdescriptors with the second greatest distance to the descriptor centre, $g_2=\{v_8, v_{11}, v_{13}, v_{14}\}$, containing a set of four different subdescriptors again with the second greatest distance to the descriptor centre, and $g_3=\{v_5, v_6, v_9, v_{10}\}$, containing the subdescriptors with the smallest distance to the descriptor centre. Thus, with this example, the subdescriptors of groups $g_1$ and $g_2$ are the same distance from the centre of the descriptor. This grouping is obtained from the grouping of FIG. 9 by subdividing original group $g_1$ into new groups $g_1$ and $g_2$. The advantage of this is that it results in groups with the same number of subdescriptors, which is desirable in optimised encoder implementations.

Within each group, the corresponding elements of the subdescriptors of the group are all assigned the same encoding priority. Based on this grouping, a group-element utilisation order may be generated, which may take the form of a 32-element ordered list, which may be encoded in 20 bytes, each list entry specifying a subdescriptor group and an element index, as illustrated in FIG. 15. The encoder of FIG. 11 may then be used again to encode a descriptor according to the group-element utilisation order of FIG. 15. It should be noted that the group-element utilisation order of FIG. 15 is merely an example, and different group-element utilisation orders may be generated by changing the priorities of the entries in the list.

Figure 16:
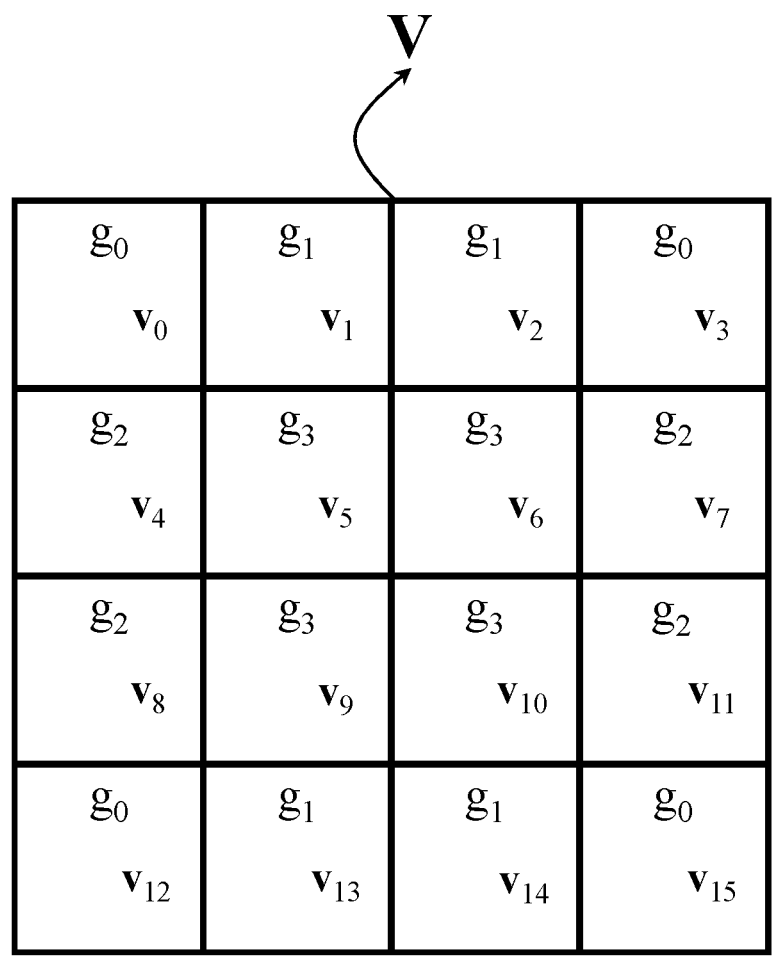
FIG. 16 shows a fourth exemplary grouping according to a first embodiment of a method according to the invention.

Clearly, the grouping of FIG. 14 into four groups is not unique. For example, an alternative grouping is shown in FIG. 16, containing groups $g_0=\{v_0, v_3, v_{12}, v_{15}\}$, $g_1=\{v_1, v_2, v_{13}, v_{14}\}$, $g_2=\{v_4, v_7, v_8, v_{11}\}$, and $g_3=\{v_5, v_6, v_9, v_{10}\}$. Thus, in FIG. 16 groups $g_0$ and $g_3$ are identical to those of FIG. 14, but the subdescriptors of $g_1$ and $g_2$ have been swapped compared to FIG. 14 so that each of those two groups contains one subdescriptor from the upper-left, upper-right, lower-left and lower-right part of the subdescriptor grid.

One difference between the encoder of FIG. 7 and the encoder of FIG. 11 is that, unlike the former which produces descriptors of any length, the latter allow encoding of descriptors whose length has a granularity decided by the subdescriptor groups. In practice, the latter may be configured to produce descriptors of any length, as will be demonstrated later.

Second Embodiment

In a second embodiment of the invention, the subdescriptors are grouped firstly according to their distance from the centre (first condition) and secondly according their reciprocal distances (second condition).

In this context, the distance between subdescriptors may again take the form of a Euclidean distance or another suitable distance measures, such as Manhattan distance.

The second condition may be, for example, that a group should not contain subdescriptors whose distance to each other is below a predetermined threshold. Thus, the predetermined threshold may be set to prevent, for example, grouping neighbouring subdescriptors.

The aim of the secondary condition is to ensure that the subdescriptors of different groups are, whenever possible, drawn from relatively distant positions of the subdescriptor grid, thereby increasing the information content of descriptors of very low numbers of features. It should be noted that the secondary condition may not always be satisfied, e.g., it is not possible to satisfy it for a group which contains all the central subdescriptors $v_5$, $v_6$, $v_9$, and $v_{10}$.

Figure 17:
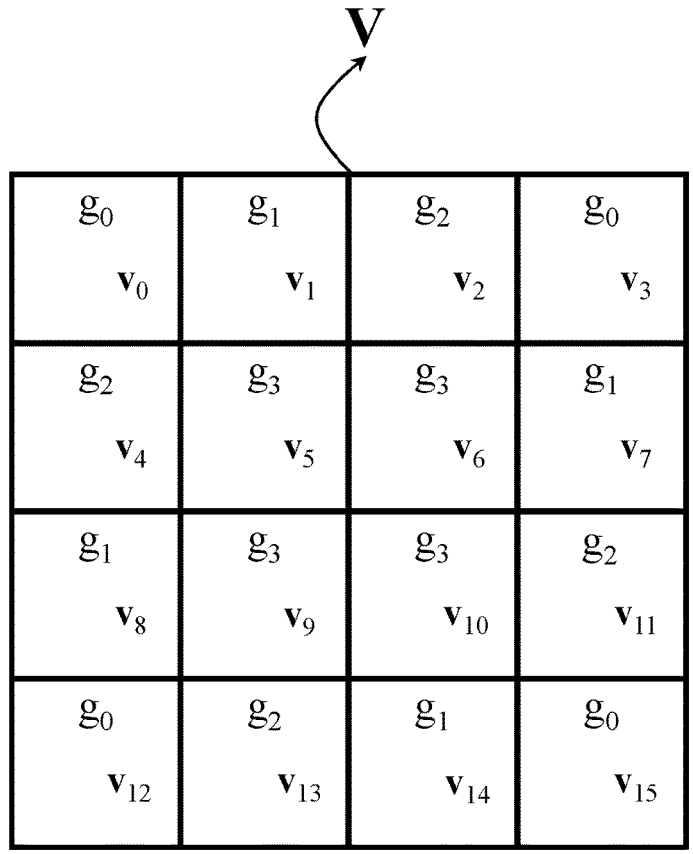
FIG. 17 shows a fifth exemplary grouping of subdescriptors of a local image descriptor according to the second and third embodiment of a method according to the invention.

For example, one such grouping is illustrated in FIG. 17, where there are four groups, namely $g_0=\{v_0, v_3, v_{12}, v_{15}\}$, containing the subdescriptors with the greatest distance to the descriptor centre, $g_1=\{v_1, v_7, v_8, v_{14}\}$, containing a set of four subdescriptors with the second greatest distance to the descriptor centre, $g_2=\{v_2, v_4, v_{11}, v_{13}\}$, containing a set of four different subdescriptors again with the second greatest distance to the descriptor centre, and $g_3=\{v_5, v_6, v_9, v_{10}\}$, containing the subdescriptors with the smallest distance to the descriptor centre. Thus, with this example, the subdescriptors of groups $g_0$, $g_1$ and $g_2$ satisfy the condition that they contain no neighbouring subdescriptors. Within each group, the corresponding elements of the subdescriptors of the group are all assigned the same encoding priority. Based on this grouping, a group-element utilisation order such as the one illustrated in FIG. 15 may be generated, and an encoder such as the one illustrated in FIG. 11 may then be used again to encode a descriptor according to the group-element utilisation order of FIG. 15.

Clearly, alternative conditions based on the distance of subdescriptors within a group may also be employed, such as maximising the total distance between subdescriptors, etc.

Third Embodiment

In a third embodiment of the invention, the subdescriptors are grouped according to their distance from the centre and the subdescriptors of each group are encoded in a sequence defined according to their corresponding encoding characteristics, such as their corresponding transforms.

Figure 1A:
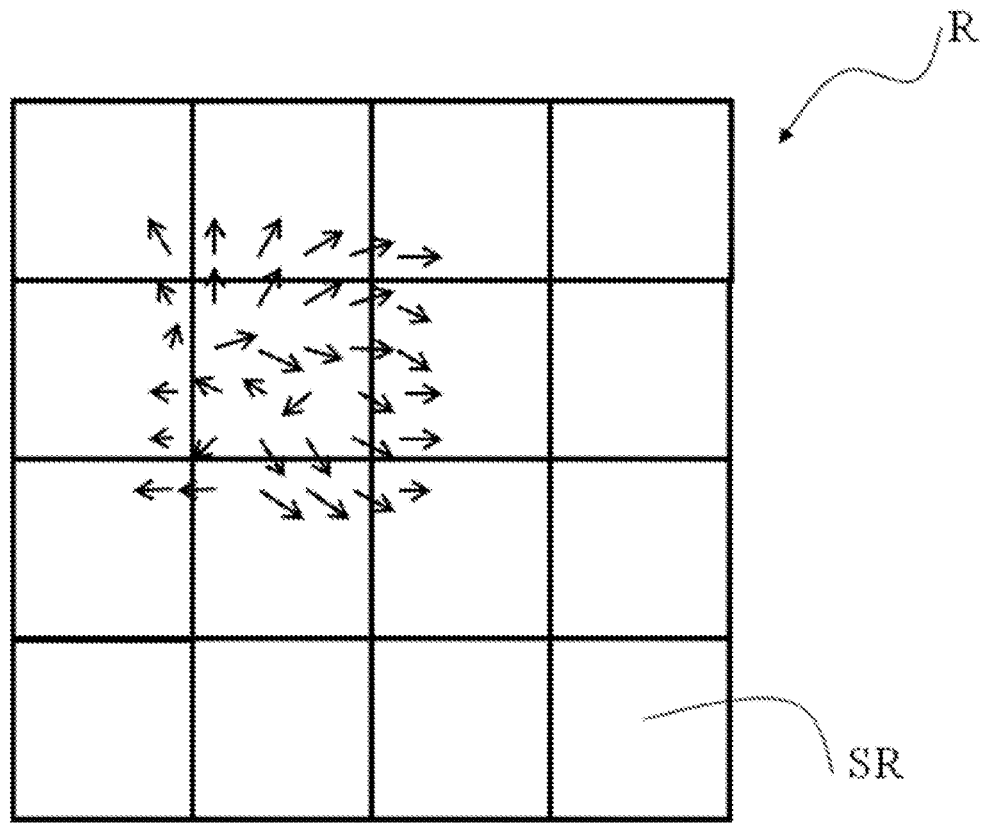
FIGS. 1*a* and 1*b* show an example of a prior art keypoint descriptor.
Figure 1B:
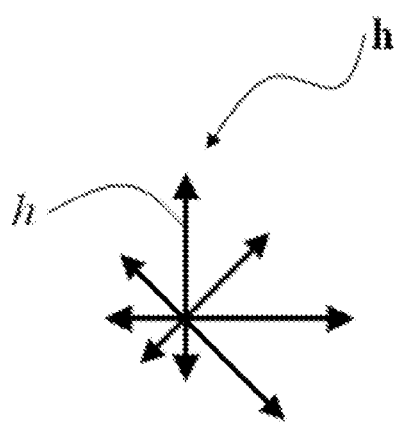
Figure 2A:
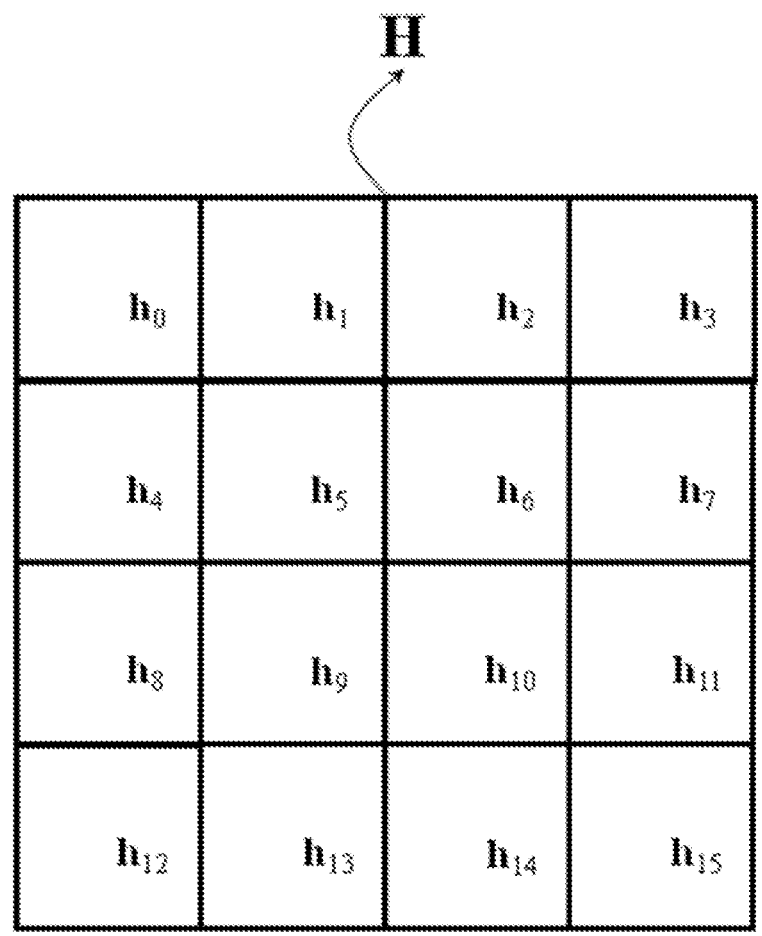
FIGS. 2*a* and 2*b* show histograms of gradients of the keypoint descriptor of FIG. 1 and bin values related to one of said histogram of gradients, respectively.
Figure 2B:
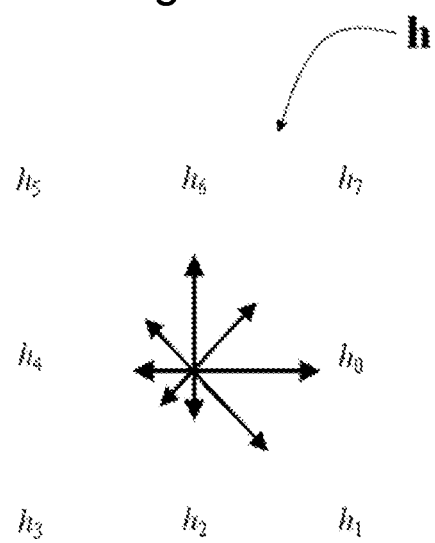
Figure 3:
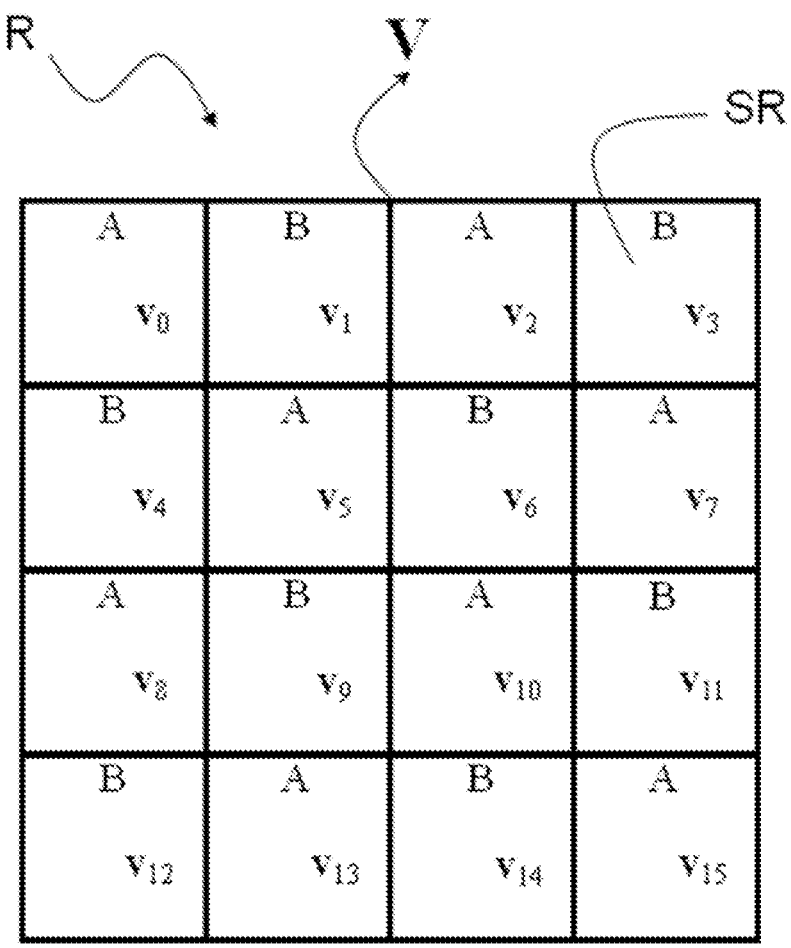
FIG. 3 shows exemplary transforms to be applied to the histograms of gradients of FIG. 2.

For example, considering the grouping of FIG. 17 of the second embodiment of the invention in conjunction with the transform deployment pattern of FIG. 3, it can be seen that, within each group, two subdescriptors are transformed according to transform A and two subdescriptors are transformed according to transform B. Therefore, it is possible to set a common encoding sequence condition that, for each group, the transform utilisation sequence must be "A A B B", i.e., an encoding sequence whereby, for each subdescriptor group, the transform of the first subdescriptor in the group is transform A, the transform of the second subdescriptor in the group is also transform A, the transform of the third subdescriptor in the group is transform B, and the transform of the fourth subdescriptor in the group is also transform B. Thus, there are groups $g_0=\{v_0, v_{15}, v_3, v_{12}\}$, containing the subdescriptors with the greatest distance to the descriptor centre, $g_1=\{v_7, v_8, v_1, v_{14}\}$, containing a set of four subdescriptors with the second greatest distance to the descriptor centre, $g_2=\{v_2, v_{13}, v_4, v_{11}\}$, containing a set of four different subdescriptors again with the second greatest distance to the descriptor centre, and $g_3=\{v_5, v_{10}, v_6, v_9\}$, containing the subdescriptors with the smallest distance to the descriptor centre. Within each group, the corresponding elements of the subdescriptors of the group are all assigned the same encoding priority. Furthermore, within each group, the transform utilisation information for the four subdescriptors in the group is always "A A B B", which means than an efficient encoder implementation does not need to identify the applicable transform of each subdescriptor.

Figure 18:
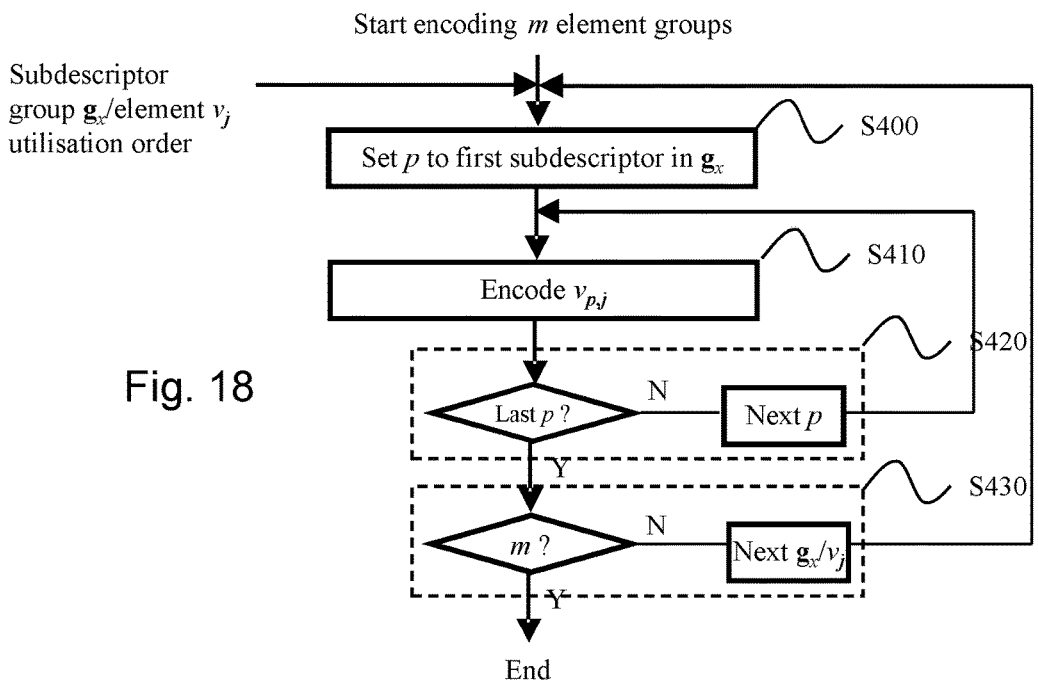
FIG. 18 illustrates the operation of an encoder using the element utilisation order of FIG. 17, according to third embodiment of a method according to the invention.

FIG. 18 illustrates the operation of such an encoder using the group-element utilisation order of FIG. 15 and configured to encode the top m groups of elements in said group-element utilisation order. With the encoder of FIG. 18, the encoding of the descriptor begins with the group of elements with the top priority (Priority 1) in the group-element utilisation order, i.e., element $v_0$ of group $g_3$ comprising subdescriptors $v_5$, $v_{10}$, $v_6$, and $v_9$. In step S400, the encoding of the descriptor begins at the first subdescriptor of the group, i.e., $v_5$. Given that all groups have a common and fixed transform utilisation order, processing moves to step S410 where the encoding of the element, i.e., $v_{5,0}$, takes place. In step S420, if the current subdescriptor is not the last subdescriptor in the group, the processing moves to the next subdescriptor, otherwise the processing moves to step S430. Then, in step S430, if the desired number of m groups of elements has not yet been encoded, the processing moves to the group of elements with the next highest priority in the group-element utilisation order, otherwise the processing ends. Thus, steps S400, S420 and S430 relate to the order in which the processing is performed and to the control of how many groups of elements to encode, while only step S410 relates to the actual encoding of the local image descriptor.

In the above description, the common encoding sequence condition is defined on the transforms which are utilised within each group, but this condition may also be defined on other encoding characteristics, such as the type and level of quantisation, or combinations thereof.

Clearly, if required, different encoding sequence conditions may be applied to different groups of subdescriptors. For example, in the first embodiment of the invention, the grouping according to FIG. 9 results in three groups, namely $g_0$, containing the four subdescriptors with the greatest distance to the descriptor centre, $g_1$, containing the eight subdescriptors with the second greatest distance to the descriptor centre, and $g_2$, containing the four subdescriptors with the smallest distance to the descriptor centre. In this case, because of the different group size, an encoding sequence condition that the transform utilisation sequence must be "A A B B" may be applied to groups $g_0$ and $g_2$, and a different encoding sequence condition that the transform utilisation sequence must be "A A A A B B B B" may be applied to group $g_1$.

Fourth Embodiment

In a fourth embodiment of the invention, the subdescriptors are grouped according to their distance from the centre and the subdescriptors of each group are ordered according to their distances between them.

The ordering condition may be, for example, that the distance between consecutive subdescriptors within a group should not be below a predetermined threshold. Thus, the predetermined threshold may be set to prevent, for example, consecutive neighbouring subdescriptors within a group.

A different ordering condition may be, for example, that the distance between consecutive subdescriptors within a group is maximised.

This ordering is particularly useful when employing large subdescriptor groups, to reduce the size of the group-element utilisation order, and partial group encoding, as explained below. It should be noted that this type of ordering may not always be possible, e.g., it is not possible to not have consecutive neighbouring descriptors for a group which contains all the central subdescriptors $v_5$, $v_6$, $v_9$, and $v_{10}$.

For example, considering the grouping illustrated in FIG. 9, it can be seen that the subdescriptors within each group may be ordered to maximise the distance between consecutive subdescriptors, starting from the subdescriptor with the lowest index within the group, resulting in groups $g_0=\{v_0, v_{15}, v_3, v_{12}\}$, $g_1=\{v_1, v_{14}, v_2, v_{13}, v_7, v_8, v_{11}, v_4\}$, and $g_2=\{v_5, v_{10}, v_6, v_9\}$. Within each group, the corresponding elements of the subdescriptors of the group are all assigned the same encoding priority.

Based on this grouping and ordering of subdescriptors within each group, a group-element utilisation order such as the one illustrated in FIG. 10 may be generated, and an encoder such as the one illustrated in FIG. 11 may then be used again to encode a descriptor according to the group-element utilisation order of FIG. 10. Alternatively, an encoder such as the one illustrated in FIG. 19 may be employed.

Figure 19:
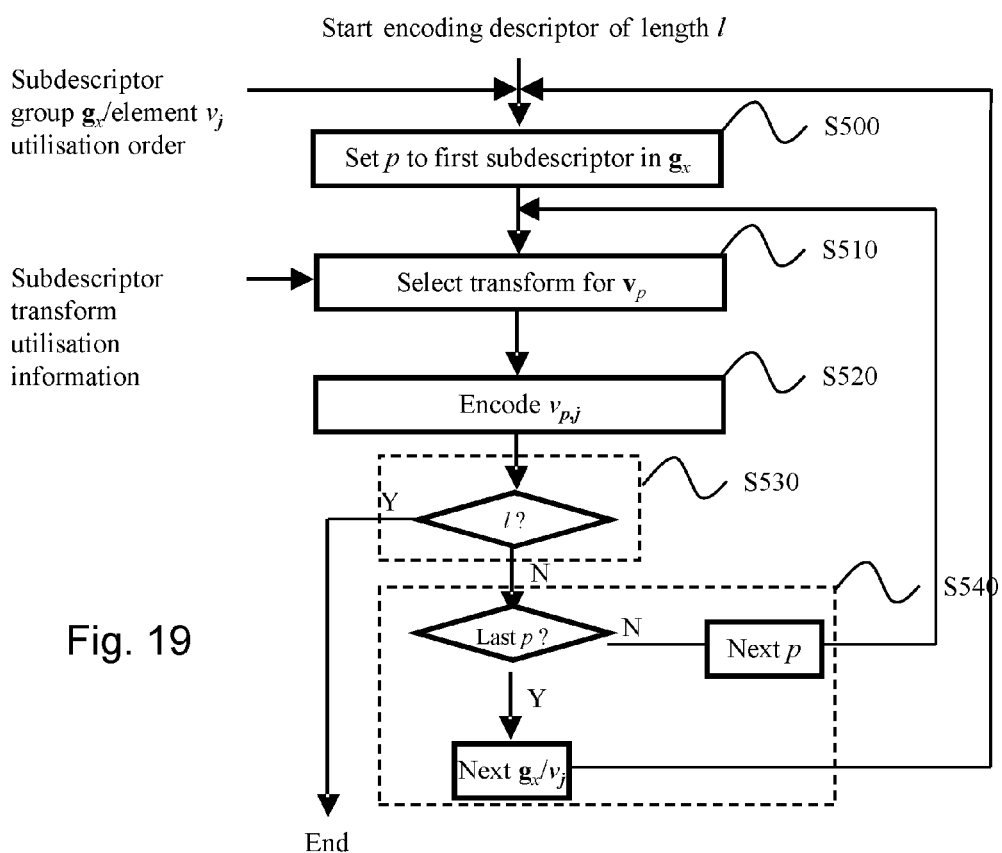
FIG. 19 illustrates the operation of an encoder according to a fourth embodiment of a method according to the invention.

More specifically, one difference between the encoder of FIG. 7 and the encoders of FIG. 11 and FIG. 18 is that, unlike the former which produces descriptors of any length, the latter allow encoding of descriptors whose length has a granularity decided by the subdescriptor groups. In practice, however, each of the encoders of FIGS. 11 and 18 may be easily configured to encode descriptors of any length by partial encoding of the last group of elements when the desired descriptor length has been reached. In this context, FIG. 19 shows such a modification of the encoder of FIG. 11. In essence, the encoder of FIG. 19 is obtained by simply swapping steps S330 and S340 of the encoder of FIG. 11, allowing the encoder of FIG. 19 to terminate the encoding of a group as soon as the desired number of elements has been encoded. Clearly, an analogous modification is also applicable to the encoder of FIG. 18.

In this context, the ordering of the subdescriptors within a group according to the distances between them is highly advantageous since it results in consecutive elements being drawn from relatively distant positions of the subdescriptor grid which, in the event of the partial encoding of a group, increases the information content of descriptors with a low number of features.

Fifth Embodiment

The previous embodiments of the invention demonstrate efficient encoding of image descriptors according to a group-element utilisation order resulting from the grouping of subdescriptors into subdescriptor groups based on their distances from the descriptor centre and/or their distances to each other.

In an alternative embodiment of the invention, subdescriptors may be grouped so that each subdescriptor within a group has an identical element utilisation set to all the other subdescriptors within a group.

Figure 20:
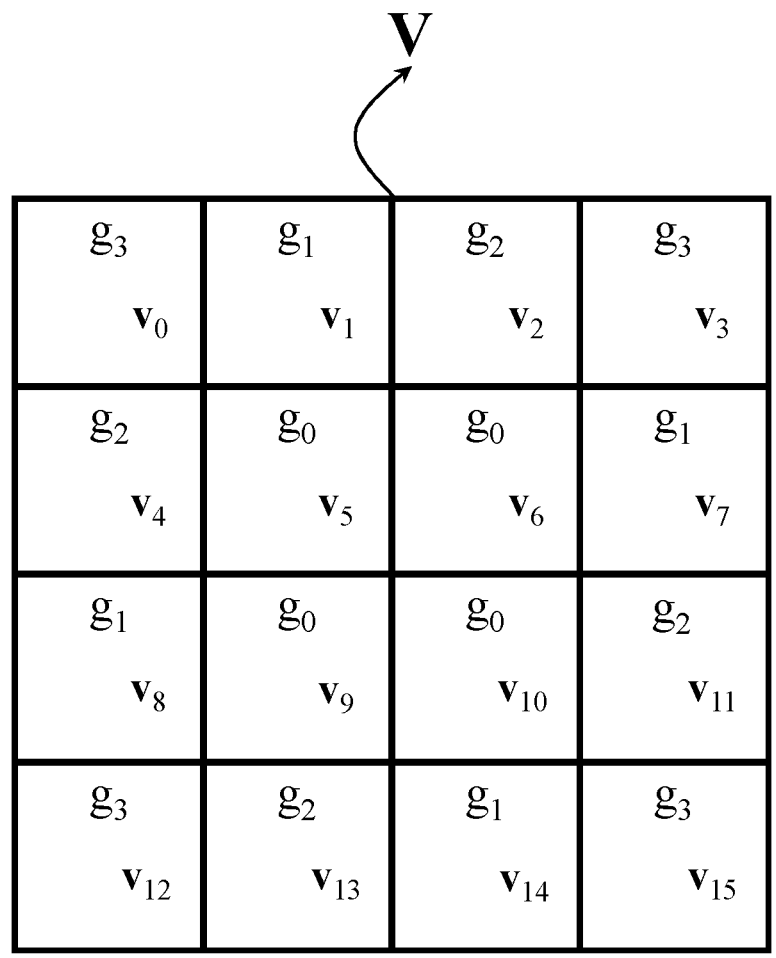
FIG. 20 shows an exemplary grouping of subdescriptors of a local image descriptor according to a fifth embodiment of a method according to the invention.
Figures 21A, 21B, 21C, 21D, 21E:
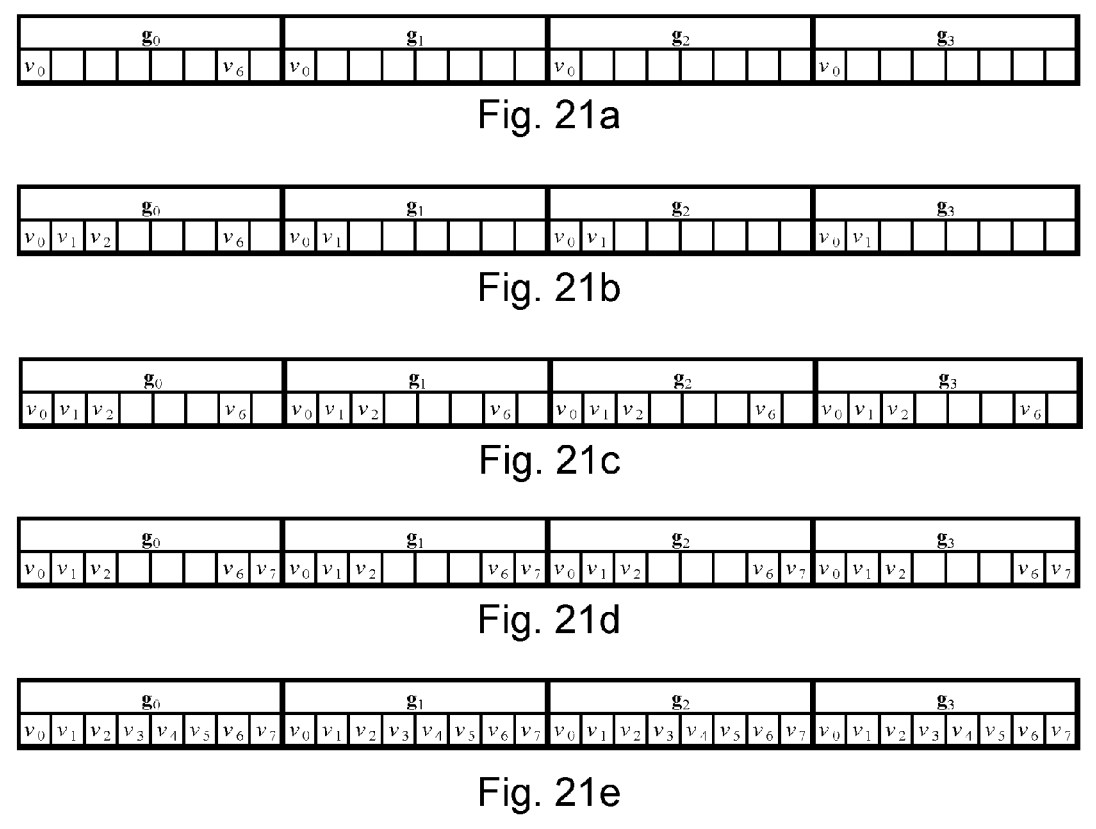

For example, consider the grouping of FIG. 20, where there are four groups, namely $g_0=\{v_5, v_6, v_9, v_{10}\}$, $g_1=\{v_1, v_7, v_8, v_{14}\}$, $g_2=\{v_2, v_4, v_{11}, v_{13}\}$, and $g_3=\{v_0, v_3, v_{12}, v_{15}\}$. This is the same grouping as in FIG. 17, but with group indexes reassigned (i.e., $g_0$ and $g_3$ have been swapped) so that groups with lower indexes contain subdescriptors which are closer to the descriptor centre. Combining this grouping with the element utilisation sets of FIG. 4a-4e leads to the group-element utilisation sets of FIG. 21a-21e.

Figure 22A:
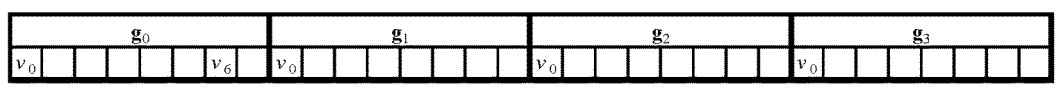
FIGS. 22a-22e show the sets of elements of FIGS. 21a-21e, respectively, when converted into group-element utilisation sets.
Figure 22B:
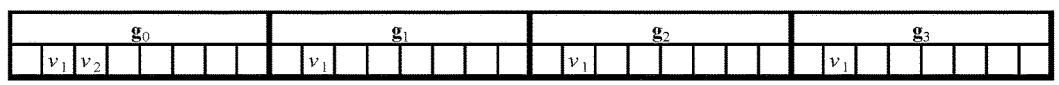
Figure 22C:
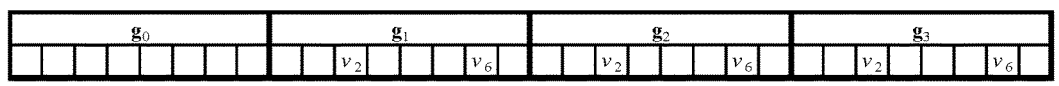
Figure 22D:
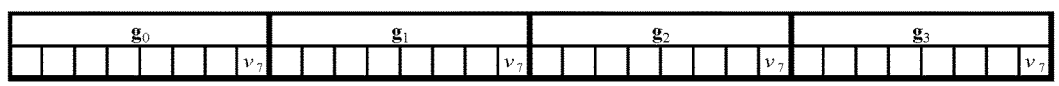
Figure 22E:
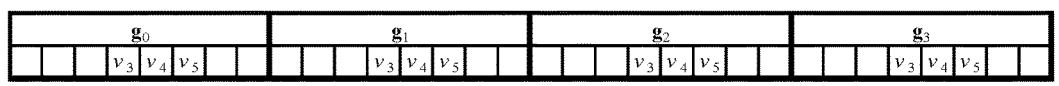

Since the set of utilised elements for each descriptor length must be the same as or a subset of the set of utilised elements for all higher descriptor lengths, the group-element utilisation sets of FIG. 21a-21e may be converted into incremental group-element utilisation sets as illustrated in FIG. 22a-22e where, for each descriptor length (for example DL2 of FIG. 22c), the corresponding element utilisation set shows only the additional elements which make up the descriptor of said descriptor length compared to the immediately lower descriptor length (for example DL1 of FIG. 22b).

Based on the incremental group-element utilisation sets of FIG. 22a-22e, an encoder may generate descriptors which can be converted to lower descriptor lengths by simple descriptor truncation.

Figure 23:
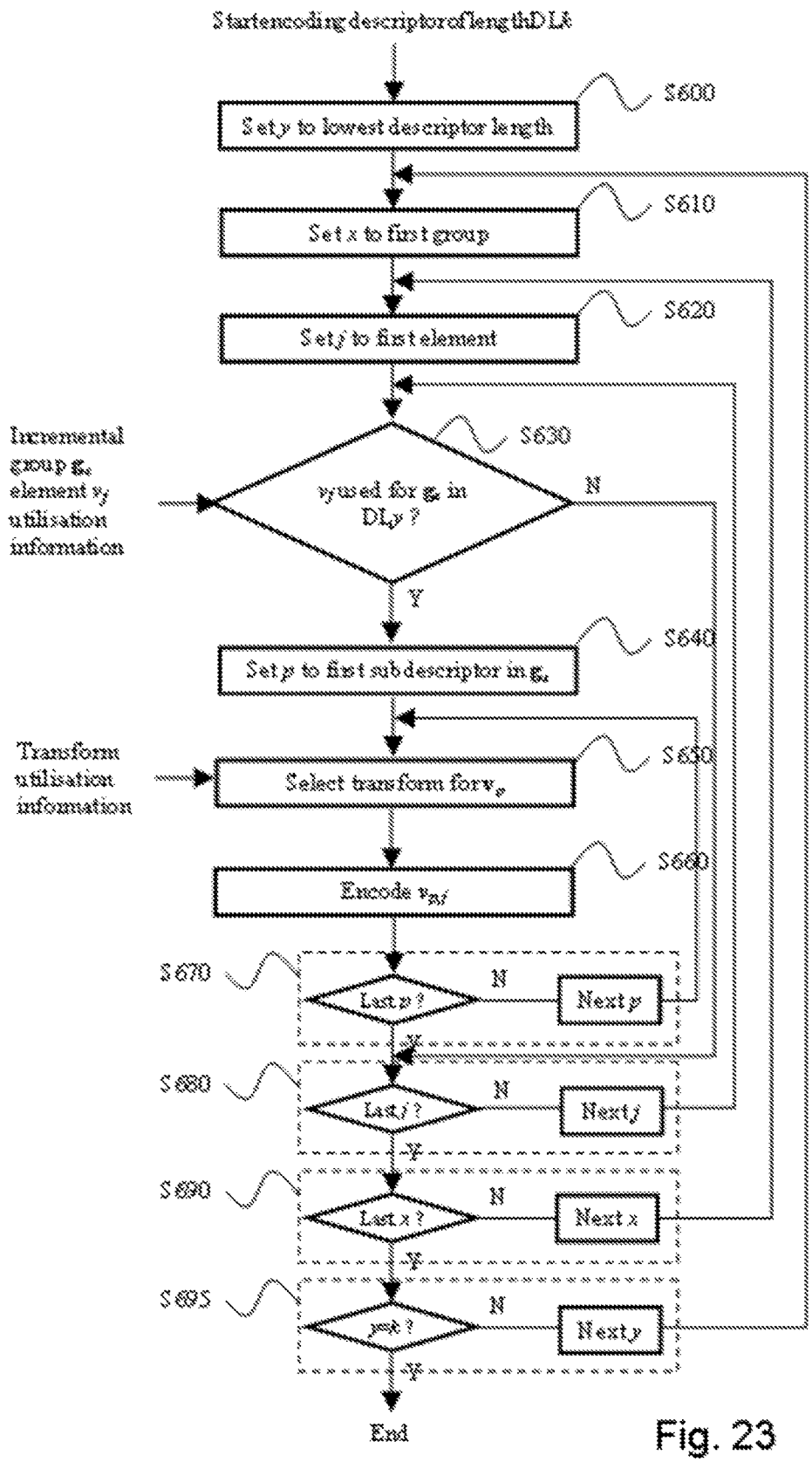
FIG. 23 illustrates the operation of an encoder for the encoding of a descriptor for providing the converted sets of elements of FIGS. 22a-22e.

FIG. 23 illustrates the operation of such an encoder for the encoding of a descriptor of length DLk. More specifically, in step S600, the processing begins by encoding a descriptor of the lowest descriptor length, i.e., DL0. In step S610, the encoding of the DL0 descriptor begins with the encoding of the first subdescriptor group, i.e., $g_0$, and in step S620 the encoding of the first subdescriptor group begins with the encoding of the first element, i.e., $v_0$. In step S630, if element $v_0$ is not in use for $g_0$ at descriptor length DL0 according to the incremental group-element utilisation sets of FIG. 22, the processing moves to step S680, otherwise the processing moves to step S640. In step S640 the first subdescriptor of group $g_0$ is selected, i.e., $v_5$, and in step S650 the appropriate transform function is selected, for example according to FIG. 3. It should be noted that the computation of descriptor V from descriptor H according to two different transforms as described here is only an example. In different embodiments, the computation of descriptor V from descriptor H may also be performed according to a single transform, for example only Transform A or only Transform B, rendering step S650 unnecessary, or according to more than two transforms. Then in Step 660, the encoding of element $v_{5,0}$ takes place. In step S670, if the current subdescriptor is not the last subdescriptor in the group, the processing moves to the next subdescriptor in the group, otherwise the processing moves to step S680. In step S680, if the current element is not the last element, i.e., $v_7$, the processing moves to the next element, otherwise the processing moves to step S690. In step S690, if the current subdescriptor group is not the last subdescriptor group, the processing moves to the next subdescriptor group, otherwise the processing moves to step S695. In step S695, if the current subdescriptor length is not the target subdescriptor length, the processing moves to the next subdescriptor length, encoding the additional elements specified by the incremental group-element utilisation sets. Otherwise, the processing ends.

Although aspects and embodiments of the present invention are presented in detail for the computation of robust, discriminative, scalable and compact image descriptors from a SIFT image descriptor, the invention is applicable to other image descriptors based on histograms of gradients, as outlined in the not yet published Italian patent application no. TO2012A000602.

Figure 24:
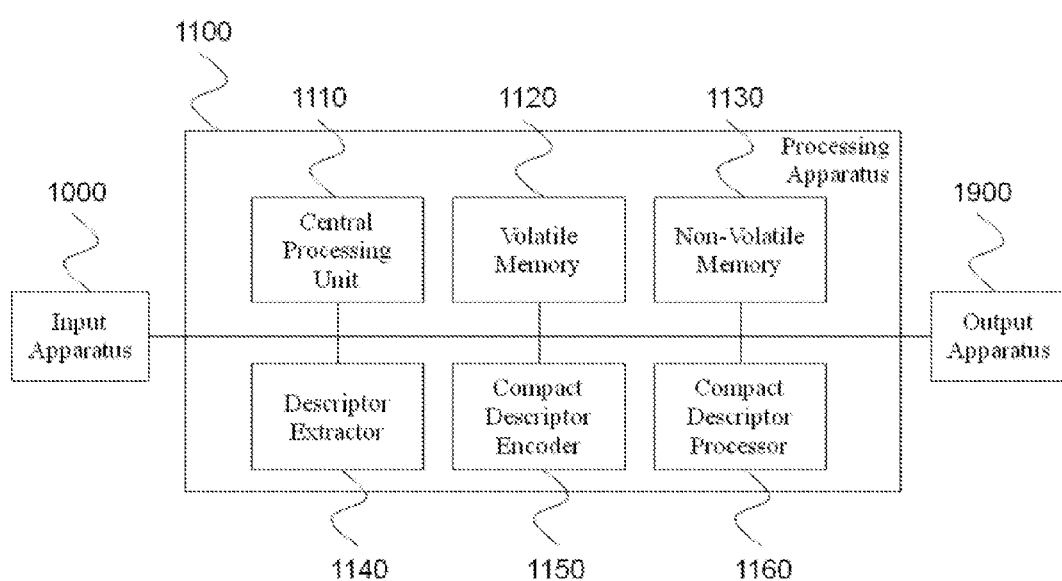
FIG. 24 illustrates an image processing device suitable for carrying out the method according to the present invention.

By way of example only, FIG. 24 illustrates a conceptual image processing apparatus for carrying out the method according to the present invention. More specifically, processing apparatus 1100 receives input, which may comprise visual data, such as image or video data, pre-calculated descriptors based on histograms of gradients, pre-calculated compact descriptors according to the method of the present invention, programming instructions, or user input, from input apparatus 1000, which may take the form of a user input apparatus, a media reader, or a receiver of transmitted signals. The processing apparatus 1100 comprises the main processing blocks of a central processing unit 1110 which controls the operations of the other processing blocks, volatile memory 1120, non-volatile memory 1130, optionally a descriptor extractor block 1140 configured to generate descriptors based on histograms of gradients, a compact descriptor encoder block 1150 configured to carry out the method according to the present invention, and optionally a compact descriptor processor block 1160 configured to process said compact descriptors, for example to establish or verify visual correspondences. Processing apparatus 1100 is connected to output apparatus 1900, which may take the form of a visual display unit, a media writer, or a transmitter of signals, which provides output which may comprise annotated visual data, such as image or video data, processing information such as established or verified visual correspondences, or compact descriptors according to the method of the present invention. It should be understood that the processing blocks and architecture shown in FIG. 24 are only conceptual and may not correspond exactly to every apparatus implementing the method according to the invention.

The method for encoding an image descriptor based on a gradient histogram and a relative image processing apparatus described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to a method for encoding an image descriptor based on a gradient histogram and a relative image processing apparatus, but may be subject to many modifications, improvements or replacements of equivalent parts and elements without departing from the inventive idea, as clearly specified in the following claims.

The invention claimed is:

1. A method for encoding an image descriptor (H) based on gradient histograms ($h_p$) into a transformed descriptor (V) comprising transformed subdescriptors ($v_p$), wherein each gradient histogram ($h_p$) comprises a plurality of histogram bins ($h_i$) and each subdescriptor ($v_p$) comprises a set of values ($v_j$), wherein said subdescriptors ($v_p$) are generated according to an element utilisation order list specifying a subdescriptor index (p) of said set of subdescriptors ($v_p$) and an element index (j) of said set of values ($v_j$), wherein said subdescriptors ($v_p$) are grouped into subdescriptor groups according to their distance from an image descriptor centre.

2. The method according to claim 1, wherein, within each subdescriptor group, corresponding values ($v_j$) of a subdescriptor group are all assigned a same encoding priority in said element utilisation order list.

3. The method according to claim 2, wherein said subdescriptors ($v_p$) are grouped into a first group containing all the subdescriptors with the smallest distance to the image descriptor centre and a second group containing all the remaining subdescriptors.

4. The method according to claim 2, wherein said subdescriptors ($v_p$) are grouped into a first group containing the subdescriptors with the greatest distance from the descriptor centre, a second group containing a first set of subdescriptors with the second greatest distance to the descriptor centre, a third group containing a second set of subdescriptors with the second greatest distance to the descriptor centre, and a fourth group containing the subdescriptors with the smallest distance to the descriptor centre.

5. The method according to claim 4, wherein said first, second, third and fourth group contains the same number of subdescriptors.

6. The method according to claim 1, wherein said subdescriptors ($v_p$) are grouped into subdescriptor groups according to their distance from an image descriptor centre and according to their reciprocal distances and wherein, within each subdescriptor group, corresponding values ($v_j$) of a subdescriptor group are all assigned a same encoding priority in said element utilisation order list.

7. The method according to claim 6, wherein said subdescriptors ($v_p$) are grouped into a first group containing the subdescriptors with the greatest distance from the descriptor centre, a second group containing a first set of subdescriptors with the second greatest distance to the descriptor centre, a third group containing a second set of subdescriptors with the second greatest distance to the descriptor centre, and a fourth group containing the subdescriptors with the smallest distance to the descriptor centre.

8. The method according to claim 6, wherein a subdescriptor group does not contain subdescriptors whose distance to each other is below a predetermined threshold.

9. The method according to claim 6, wherein said reciprocal distances comprises maximising the total distance between subdescriptors.

10. The method according to claim 1, wherein said subdescriptors ($v_p$) are grouped into subdescriptor groups according to their distance from an image descriptor centre and are ordered according to their reciprocal distances and wherein, within each subdescriptor group, corresponding values ($v_j$) of a subdescriptor group are all assigned a same encoding priority in said element utilisation order list.

11. The method according to claim 10, wherein a subdescriptor group does not contain consecutive subdescriptors whose distance is below a predetermined threshold.

12. The method according to claim 10, wherein said reciprocal distances comprises maximising the distance between consecutive subdescriptors.

13. The method according to claim 1, wherein said subdescriptors ($v_p$) are grouped into subdescriptor groups according to their distance from an image descriptor centre and the subdescriptors of each group are encoded in a sequence defined according to their corresponding encoding characteristics and wherein, within each subdescriptor group, corresponding values ($v_j$) of a subdescriptor group are all assigned a same encoding priority in said element utilisation order list.

14. The method according to claim 13, wherein said encoding characteristics are corresponding transforms.

15. The method according to claim 14, wherein, for each subdescriptor group, the transform of a first subdescriptor in the group is a first type of transform (A), the transform of a second subdescriptor in the group is said first type of transform (A), the transform of a third subdescriptor in the group is a second type of transform (B) and the transform of a fourth subdescriptor in the group is said second type of transform (B).

16. The method according to claim 13, wherein said encoding characteristics are type and level of quantisation, or combinations thereof.

17. The method according to claim 2, wherein higher priority is given to a specific class of values.

18. The method according to claim 2, wherein higher priority is given to the subdescriptor groups closest to the descriptor centre.

19. The method according to claim 2, wherein said element utilisation list is stored or transmitted alongside the image descriptor.

20. The method for encoding an image descriptor (H) according to claim 1, wherein said image descriptor is converted to a descriptor having a reduced length by truncating one or more last elements of said descriptor.

21. The method for encoding an image descriptor according to claim 1, wherein said element utilisation order takes the form of a 16 or 24 or 32 or 128-element ordered list.

22. The method according to claim 1, wherein a number of groups (m) or corresponding number of elements (l) in the descriptor may be stored or transmitted alongside the descriptor.

23. The method according to claim 22, wherein the number of groups (m) or the corresponding number of elements (l) are stored or transmitted at an image level.

24. An image processing apparatus configured to transform at least one image descriptor into a transformed image descriptor, the image processing apparatus comprising:
  a memory unit for storing:
    image data comprising at least one image descriptor based on a gradient histogram, comprising transformed subdescriptors ($v_p$), wherein each gradient histogram ($h_p$) comprises a plurality of histogram bins ($h_i$) and each subdescriptor ($v_p$) comprises a set of values ($v_j$), and
    an element utilisation order list specifying a subdescriptor index (p) of said set of subdescriptors ($v_p$) and an element index (j) of said set of values ($v_j$);
  a processing unit operatively connected to said memory unit, configured to generate a transformed image descriptor comprising subdescriptors ($v_p$) according to said element utilisation order list, wherein said subdescriptors ($v_p$) are grouped into subdescriptor groups according to their distance from an image descriptor centre.

25. The apparatus according to claim 24, wherein said processing unit is further configured to assign, within each subdescriptor group, a same encoding priority to all corresponding values ($v_j$) of a subdescriptor group in said element utilisation order list.

* * * * *